United States Patent
Kotake et al.

(10) Patent No.: US 9,804,265 B2
(45) Date of Patent: Oct. 31, 2017

(54) RADAR DEVICE

(71) Applicants: Nobuki Kotake; Masaharu Imaki; Shumpei Kameyama

(72) Inventors: Nobuki Kotake, Tokyo (JP); Masaharu Imaki, Tokyo (JP); Shumpei Kameyama, Tokyo (JP)

(73) Assignee: Mitsubushi Electric Corporation, Tokyo (JP)

( * ) Notice: Subject to any disclaimer, the term of this patent is extended or adjusted under 35 U.S.C. 154(b) by 410 days.

(21) Appl. No.: 14/404,294

(22) PCT Filed: Mar. 4, 2013

(86) PCT No.: PCT/JP2013/055825
§ 371 (c)(1),
(2) Date: Nov. 26, 2014

(87) PCT Pub. No.: WO2014/024508
PCT Pub. Date: Feb. 13, 2014

(65) Prior Publication Data
US 2015/0146191 A1 May 28, 2015

(30) Foreign Application Priority Data
Aug. 8, 2012 (JP) ................................. 2012-176070

(51) Int. Cl.
*G01C 3/08* (2006.01)
*G01S 17/95* (2006.01)
(Continued)

(52) U.S. Cl.
CPC .............. *G01S 17/95* (2013.01); *G01S 7/484* (2013.01); *G01S 7/487* (2013.01); *G01S 7/4817* (2013.01);
(Continued)

(58) Field of Classification Search
CPC ...... G01S 17/95; G01S 7/4817; G01S 7/4818; G01S 7/484; G01S 7/4868; G01S 7/487; G01S 17/42; G01S 17/58
See application file for complete search history.

(56) References Cited

U.S. PATENT DOCUMENTS

| 4,589,070 A | 5/1986 | Kyrazis | |
|---|---|---|---|
| 7,827,861 B2 * | 11/2010 | LaWhite | ................ G01P 5/24 356/28.5 |
| 2006/0061753 A1 | 3/2006 | Harris et al. | |

FOREIGN PATENT DOCUMENTS

| JP | 2002-168948 A | 6/2002 |
|---|---|---|
| JP | 2006-502401 A | 1/2006 |

(Continued)

OTHER PUBLICATIONS

International Search Report; PCT/JP2013/055825; dated Mar. 26, 2013.
(Continued)

*Primary Examiner* — Samantha K Abraham
(74) *Attorney, Agent, or Firm* — Studebaker & Brackett PC

(57) ABSTRACT

An optimal position analysis unit 24 specifies an optimal installation position for a photodetector 6 by using spectra which by a spectrum and wind speed computing unit 23 calculated by analyzing output data of a photodetector 6 installed at different installation positions, controls a position adjustment made by an optical unit adjustment driving unit 7, and optimizes the installation position of the photodetector 6.

17 Claims, 18 Drawing Sheets

(51) Int. Cl.
- *G01S 7/487* (2006.01)
- *G01S 17/42* (2006.01)
- *G01S 17/58* (2006.01)
- *G01S 7/481* (2006.01)
- *G01S 7/484* (2006.01)
- *G01S 7/486* (2006.01)

(52) U.S. Cl.
CPC .......... *G01S 7/4818* (2013.01); *G01S 7/4868* (2013.01); *G01S 17/42* (2013.01); *G01S 17/58* (2013.01)

(56) References Cited

FOREIGN PATENT DOCUMENTS

| | | |
|---|---|---|
| JP | 2006-284260 A | 10/2006 |
| JP | 2007-315758 A | 12/2007 |
| JP | 2009-162678 A | 7/2009 |
| JP | 2009-300133 A | 12/2009 |
| JP | 2010-127918 A | 6/2010 |

OTHER PUBLICATIONS

Fukao, S. et al.; "Radar Remote Sensing of Weather and the Atmosphere"; Kyoto University Press; pp. 4-6; 2005; ISBN: 4-87698-653-3.

Kameyama, S. et al.; "Semianalytic pulsed coherent laser radar equation for coaxial and apertured systems using nearest Gaussian approximation"; Appl. Opt.; vol. 49; No. 27; pp. 5169-5174; 2010.

The extended European search report issued by the European Patent Office on Feb. 29, 2016, which corresponds to European Patent Application No. 13827399.0-1812 and is related to U.S. Appl. No. 14/404,294.

* cited by examiner f : Focal Distance
a : Focused Distance
△a : Amount of Displacement with Reference to a
z : Distance to Target
D : Receiving Aperture
L : Light Receiving Surface Area
△L : Light Receiving Surface Area after Movement by △a
K : Back Focus → Perform Coherent Integration within Each Range Bin Perform Incoherent Integration within Each Range Bin

RADAR DEVICE

FIELD OF THE INVENTION

The present invention relates to a radar device that measures the speed of fine liquid droplets or solid particles (aerosol), or the like floating in, for example, atmospheric air.

BACKGROUND OF THE INVENTION

A radar device is known as a device that measures the position of an object existing at a distant point.

A radar device emits a wave, such as an electromagnetic wave or an acoustic wave, into space, and receives a wave which is reflected by an object which is an observation object and returns thereto, and analyzes the wave to measure the distance and the angle from the radar device to the object.

A weather radar device that sets a fine aerosol floating in atmospheric air as an observation object, and that measures the speed (wind speed) at which the aerosol is moving from the amount of phase rotation of a wave which is reflected by the aerosol is known among radar devices.

Further, because a laser radar device that uses light as an electromagnetic wave especially, among weather radar devices, has a very small divergence of the beam emitted thereby and can observe an object with a high angular resolution, the laser radar device is used as a wind direction and wind speed radar device (refer to nonpatent reference 1).

A conventional laser radar device emits laser light into atmospheric air, and, after that, receives laser light which receives a Doppler frequency shift according to the movement speed of an aerosol in the atmospheric air, and performs heterodyne detection on the laser light and local light, thereby detecting a Doppler signal corresponding to the wind speed.

In general, the laser light reflected from the aerosol in the atmospheric air at each altitude is split into segments by time (laser light split by time is referred to as a "range bin"), and a coherent integration at very short intervals is performed within each range bin, as shown in FIG. 15.

After that, after a Fourier transform is performed within the range bin, N incoherent integrations are performed on a pulse, as shown in FIG. 16, thereby improving the signal to noise ratio (referred to as the SNR from here on).

It is generally known that when the N incoherent integrations are performed, the SNR is improved by a factor of root N (for example, refer to patent references 1 and 2).

As a result, a power envelope as shown in FIG. 17 can be acquired.

However, it is known that in such a measurement of a wind speed as above, the coherency of the Doppler signal is weak. More specifically, it is known that the coherence time of the Doppler signal is short.

For example, it is known that when the received light of the radar device is scattered light reflected from an aerosol in the atmospheric air, the coherence time of the Doppler signal is of the order of microseconds (μs).

Therefore, a conventional laser radar device provides an improvement in the SNR by performing N incoherent integrations on a pulse, as mentioned above.

For example, a method of deriving an optimal number of integrations in order to make it possible to carry out a high-accuracy wind measurement is disclosed in patent references 1 and 2.

When the density of the aerosol is high as a result of this integration processing, as shown in FIG. 17, a high-accuracy wind measurement can be carried out.

RELATED ART DOCUMENT

Patent Reference

Patent reference 1: Japanese Unexamined Patent Application Publication No. 2006-284260 (paragraph number [0015])
Patent reference 2: Japanese Unexamined Patent Application Publication No. 2002-168948 (paragraph number [0015])

Nonpatent Reference

Nonpatent reference 1: "Radar Remote Sensing of Weather and The Atmosphere" ISBN 4-87698-653-3
Nonpatent reference 2: Syumpei Kameyama et al., "Semi-analytic pulsed coherent laser radar equation for coaxial and apertured systems using nearest Gaussian approximation," Appl. Opt., Vol 49, No. 27, pp 5169-5174, 2010.

SUMMARY OF THE INVENTION

Problems to be Solved by the Invention

Because the conventional radar device is constructed as above, a problem is that while a high-accuracy wind measurement can be carried out when the density of the aerosol is high, when the density of the aerosol is low, a high-accuracy wind measurement cannot be carried out unless further integration processing is performed.

Another problem is that if reflected light is not acquired from the aerosol in the atmospheric air which is an observation object, no wind speed cannot be acquired because the receive SNR is not improved up to a detection intensity threshold even if integration processing is performed.

A further problem is that when receiving a request to acquire the wind speed of an observation object located at a relatively short distance at a high data acquisition speed from the user, the number of integrations can be decreased, but it is difficult to improve the data acquisition speed while maintaining a high signal intensity because the signal intensity is decreased by decreasing the number of integrations.

A still further problem is that when scanning the transmission and received beams at a high speed and when performing a wind measurement of an object at a long distance, the reception coupling efficiency degrades and therefore a high-accuracy wind measurement cannot be carried out.

The present invention is made in order to solve the above-mentioned problems, and it is therefore an object of the present invention to provide a radar device that can measure the speed of an observation object located at a desired distance in a short time with a high degree of accuracy.

Means for Solving the Problem

In accordance with the present invention, there is provided a radar device including: an optical oscillator that oscillates light; a light transmitter and receiver that has an optical system that emits the light oscillated by the optical oscillator into atmospheric air and also receives the above-mentioned light which is reflected by an observation object existing in the atmospheric air and returns thereto, and that outputs data showing the signal intensity of the light received by the optical system; a spectrum and speed calculator that calculates a spectrum by analyzing the data outputted from the light transmitter and receiver, and also calculates the speed of the observation object and a signal to noise ratio for each distance to the observation object from the spectrum; and an optical condition adjuster that adjusts an optical condition of the light transmitter and receiver, in which an optical condition optimizer determines the optical condition from a distance where the signal to noise ratio calculated by the spectrum and speed calculator crosses a threshold again after exceeding the threshold.

Advantages of the Invention

In accordance with the present invention, because the optical condition optimizer is constructed in such a way as to determine the optical condition from the distance where the signal to noise ratio calculated by the spectrum and speed calculator crosses the threshold again after exceeding the threshold, there is provided an advantage of being able to measure the speed of an observation object located at a desired distance in a short time with a high degree of accuracy.

EMBODIMENTS OF THE INVENTION

Hereafter, the preferred embodiments of the present invention will be explained in detail with reference to the drawings.

Embodiment 1

Figure 1:
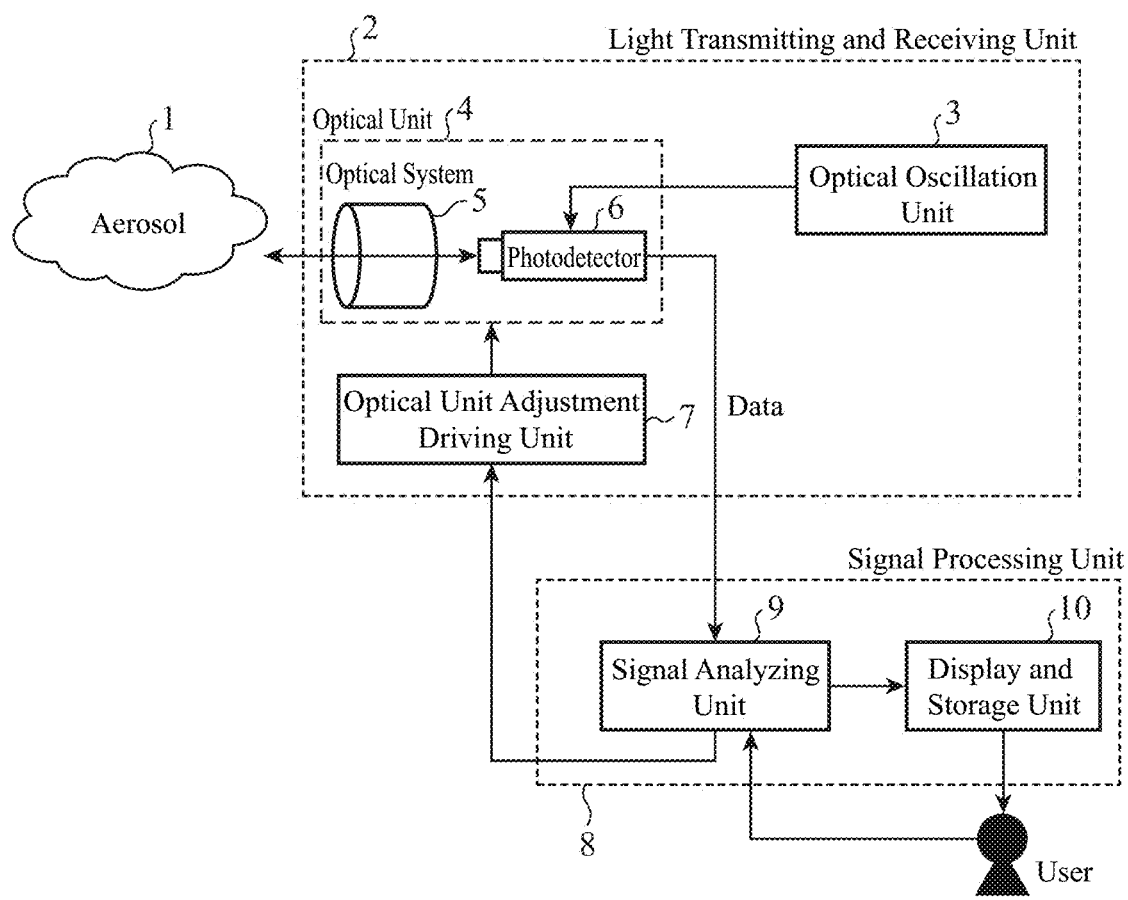
FIG. 1 is a structural diagram showing a radar device in accordance with Embodiment 1 of the present invention.

FIG. 1 is a structural diagram showing a radar device in accordance with Embodiment 1 of the present invention.

Referring to FIG. 1, an aerosol 1 is an observation object and is fine liquid droplets or solid particles floating in atmospheric air.

A light transmitting and receiving unit 2 transmits and receives light, and is comprised of an optical oscillation unit 3, an optical unit 4, and an optical unit adjustment driving unit 7.

The optical oscillation unit 3 of the light transmitting and receiving unit 2 is a laser light source that oscillates laser light, and the optical oscillation unit 3 constructs an optical oscillator.

The optical unit 4 of the light transmitting and receiving unit 2 is comprised of an optical system 5, such as a lens, and a photodetector 6, and performs a process of emitting the laser light oscillated by the optical oscillation unit 3 into atmospheric air and also receiving laser light which is reflected by the aerosol 1 existing in the atmospheric air and returns thereto, and outputting data showing the signal intensity of the laser light to a signal analyzing unit 9. The optical unit 4 constructs a light transmitter and receiver.

The optical unit adjustment driving unit 7 of the light transmitting and receiving unit 2 is an actuator that adjusts an optical condition of the light transmitting and receiving unit 2 by adjusting the position where the optical unit 4 is installed according to a command from the signal analyzing unit 9.

The optical unit 4 can be comprised of a single lens or a plurality of lenses. In a case in which the optical unit is comprised of a plurality of lenses, for example, a condensing optical system, such as a beam expander which will be mentioned below, is used.

Figure 18:
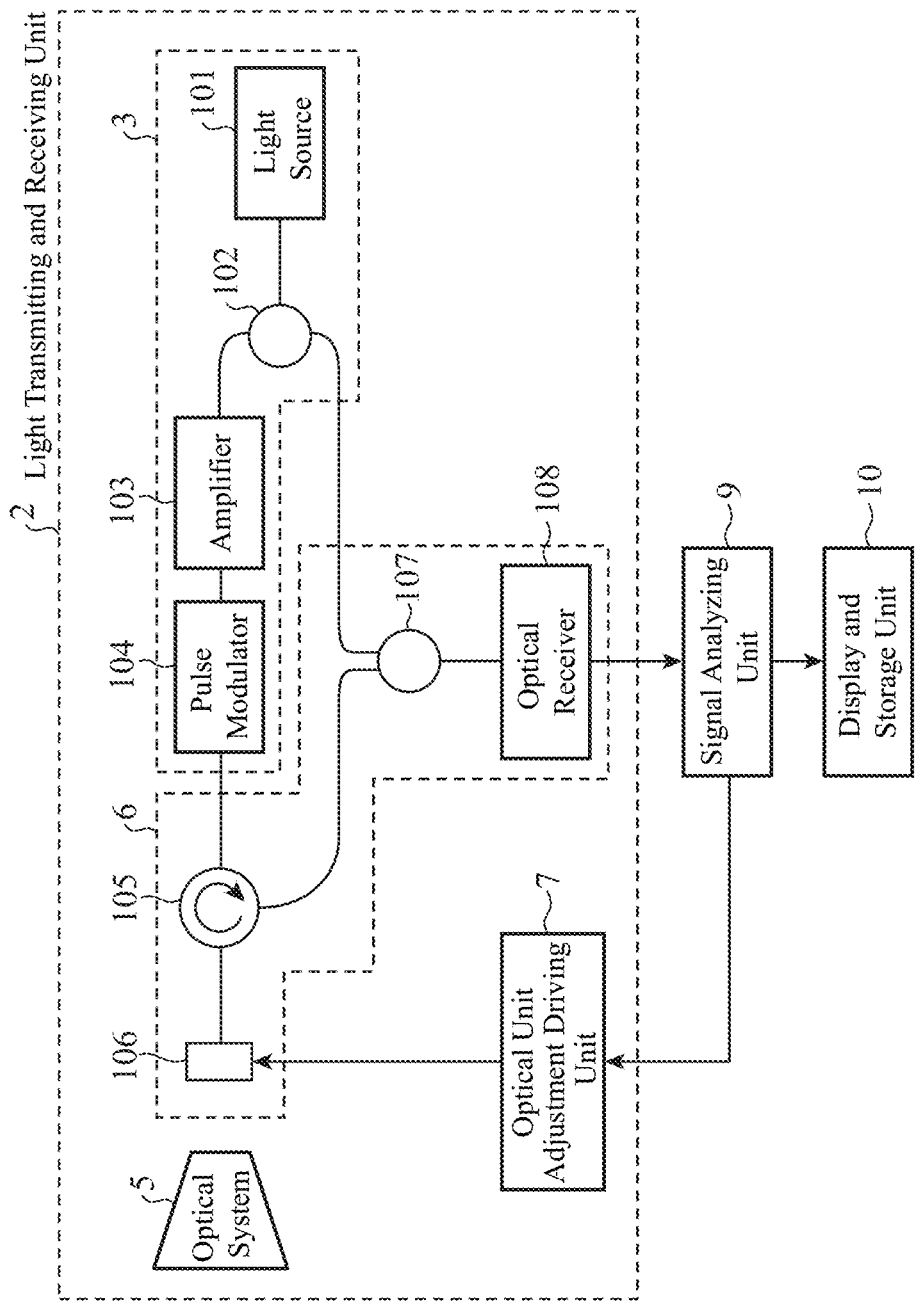
FIG. 18 is a structural diagram showing the details of a light transmitting and receiving unit 2 shown in FIG. 1.

FIG. 18 is a structural diagram showing the details of the light transmitting and receiving unit 2 shown in FIG. 1 in which this light transmitting and receiving unit is shown simply.

Referring to FIG. 18, a light source 101 is, for example, a laser light source that oscillates laser light.

An optical splitter 102 is an optical component that splits the laser light oscillated by the light source 101 at a constant ratio.

An amplifier 103 amplifies laser light split by the optical splitter 102.

A pulse modulator 104 is comprised of, for example, an acoustooptic element and so on, and performs pulse modulation on the laser light amplified by the amplifier 103.

An optical circulator 105 is an optical component that outputs the laser light on which the pulse modulation is performed by the pulse modulator 104 to a fiber end 106, and also outputs laser light (received light) incident thereon from the fiber end 106 to an optical coupler 107.

The optical coupler 107 is an optical component that detects an optical beat which is the difference between the frequency of laser light split by the optical splitter 102 and the frequency of the laser light (received light) outputted from the optical circulator 105.

An optical receiver 108 performs a process of performing heterodyne detection on the optical beat detected by the optical coupler 107 to convert the light signal into an electric signal, determining the signal intensity of the laser light (received light) from the electric signal, and outputting data showing the signal intensity to the signal analyzing unit 9.

Further, the optical receiver 108 can also reduce a measurement error caused by a fluctuation of DC by being provided with a balanced receiver. The optical receiver is not limited to this example as long as the optical receiver serves this function.

In the example of FIG. 18, the optical unit adjustment driving unit 7 moves the fiber end 106 so as to change the focused position of the light. In this embodiment, the light transmitting and receiving unit has an ideal coaxial structure for transmission/reception in which the transmission beam and the received beam are generated from an identical single optical fiber.

Although the case of moving the focused position of the transmission beam and that of the received beam together by moving the fiber end 106 is shown in the example of FIG. 18, the focused positions of the transmission beam and the received beam can be moved separately. The present invention can also be applied to this variant, and the structure will be mentioned below.

In the example of FIG. 18, the photodetector 6 is comprised of the optical circulator 105, the fiber end 106, the optical coupler 107, and the optical receiver 108.

Hereafter, the words "move the photodetector 6" include not only a meaning of moving the entire photodetector 6, but also a meaning of moving a part of the photodetectors 6 (e.g., the fiber end 106) in the structure of FIG. 18.

Further, although all the optical components are connected by way of optical fibers in the light transmitting and receiving unit 2 shown in FIG. 18, they need not necessarily be connected by way of optical fibers. For example, there can be provided space among all the optical components. In this case, a focused distance varying function can be provided for the optical system 5, and the optical system 5, instead of the fiber end 106, can be determined as the target which is controlled by the optical unit adjustment driving unit 7.

As a concrete example of the optical system having the focused distance varying function, for example, there is a beam expander, and there can be considered a structure in which the optical unit adjustment driving unit 7 varies the focused distance by controlling the beam expander.

Although the words "focused distance" and the words "focal distance" exist in the following explanation, these sets of words have the same meaning, and have a meaning of a distance at which the transmission beam or the received beam is focused.

The signal processing unit 8 is comprised of the signal analyzing unit 9 and a display and storage unit 10.

The signal analyzing unit 9 of the signal processing unit 8 consists of, for example, a semiconductor integrated circuit equipped with a CPU, or a one chip microcomputer, and performs a process of calculating a spectrum by analyzing the data outputted from the optical unit 4, and also calculating a wind speed as the speed of the aerosol 1.

Further, the signal analyzing unit 9 performs a process of specifying an optimal installation position (optimal optical condition) for the optical unit 4 by using spectra which the signal analyzing unit calculates by analyzing the output data of the optical unit 4 at different installation positions (under different optical conditions) respectively, and controlling the position adjustment (optical condition adjustment) made by the optical unit adjustment driving unit 7 so as to optimize the installation position of the optical unit 4 (optical condition).

The display and storage unit 10 of the signal processing unit 8 consists of, for example, a storage unit, such as a RAM or a hard disk, a GPU (Graphics Processing Unit), a display, and so on, and performs a process of storing the wind speed or the like which is calculated by the signal analyzing unit 9, and also displaying the wind speed or the like. The display and storage unit 10 constructs an observation result outputter.

Although it is assumed that each of the light transmitting and receiving unit 2 and the signal processing unit 8 which are components of the radar device consists of hardware for exclusive use in the example of FIG. 1, all or a part of the radar device can alternatively consist of a computer.

For example, in a case in which the signal processing unit 8 which is a part of the radar device consists of a computer, a program in which the details of the processing performed by the signal processing unit 8 are described can be stored in a memory of the computer, and a CPU of the computer can be made to execute the program stored in the memory.

Figure 2:
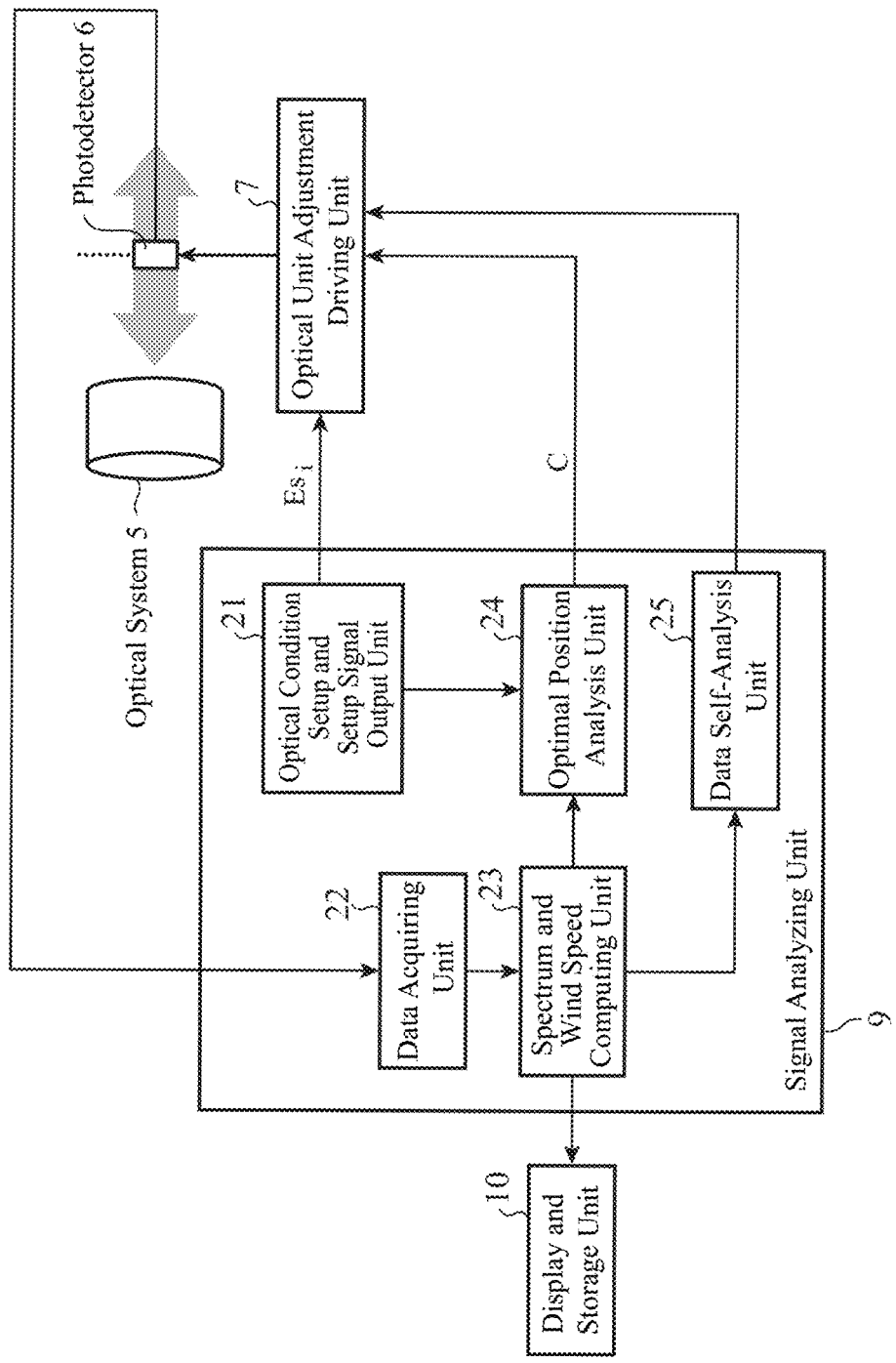
FIG. 2 is a structural diagram showing a signal analyzing unit 9 of the radar device in accordance with Embodiment 1 of the present invention.

FIG. 2 is a structural diagram showing the signal analyzing unit 9 of the radar device in accordance with Embodiment 1 of the present invention.

Referring to FIG. 2, an optical condition setup and setup signal output unit 21 performs a process of outputting a setup signal for adjusting the position where the photodetector 6 of the optical unit 4 is installed, or the position where the optical system 5 of the optical unit 4 is installed (a setup signal for adjusting an optical condition) to the optical unit adjustment driving unit 7.

Figure 4:
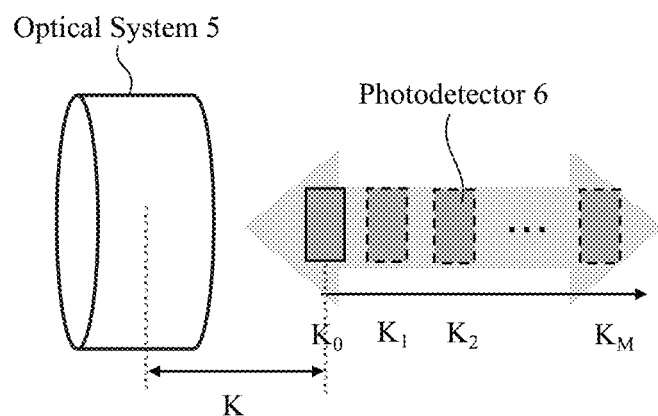
FIG. 4 is an explanatory drawing showing an adjustment of the installation position of a photodetector 6.

For example, in a case of adjusting the position where the photodetector 6 of the optical unit 4 is installed, when the distance (back focus) from the optical system 5 to the photodetector 6 is denoted by K, the optical condition setup and setup signal output unit outputs a setup signal for moving the photodetector 6 from an initial position $K_0$ which is the closest to the optical system 5 to a position $K_M$ in order of ($K_0 \to K_1 \to K_2 \to \ldots \to K_M$) to the optical unit adjustment driving unit 7 with reference to either a step having a constant interval or a table generated in advance, as shown in FIG. 4.

An optical condition adjuster is comprised of the optical unit adjustment driving unit 7 and the optical condition setup and setup signal output unit 21.

A data acquiring unit 22 performs a process of acquiring the data outputted from the photodetector 6 of the optical unit 4.

A spectrum and wind speed computing unit 23 performs a process of calculating a spectrum by analyzing the data acquired by the data acquiring unit 22, and also calculating a wind speed as the speed of the aerosol 1.

A spectrum and speed calculator is comprised of the data acquiring unit 22, and the spectrum and wind speed computing unit 23.

An optimal position analysis unit 24 performs a process of, every time when the optical condition setup and setup signal output unit 21 adjusts the installation position of the photodetector 6 (optical condition), after the spectrum and wind speed computing unit 23 calculates spectra, searching for an optimal installation position (optimal optical condition) for the photodetector 6 (or the optical system 5) by specifying an installation position of the photodetector 6 (or an installation position of the optical system 5) where the signal intensity of the laser light received by the optical system 5 is equal to or greater than a desired signal intensity by using a spectrum corresponding to each installation position.

Further, the optimal position analysis unit 24 performs a process of outputting a control signal C for moving the installation position of the photodetector 6 (or the installation position of the optical system 5) to the optimal installation position to the optical unit adjustment driving unit 7.

The optimal position analysis unit 24 constructs an optical condition optimizer.

A data self-analysis unit 25 performs a process of determining whether the signal intensity of the laser light received by the optical system 5 is equal to or greater than the desired signal intensity by using the spectra calculated by the spectrum and wind speed computing unit 23, and, when the signal intensity of the laser light is not equal to or greater than the desired signal intensity, outputting an adjustment command for adjusting the installation position to the optical unit adjustment driving unit 7.

Figure 3:
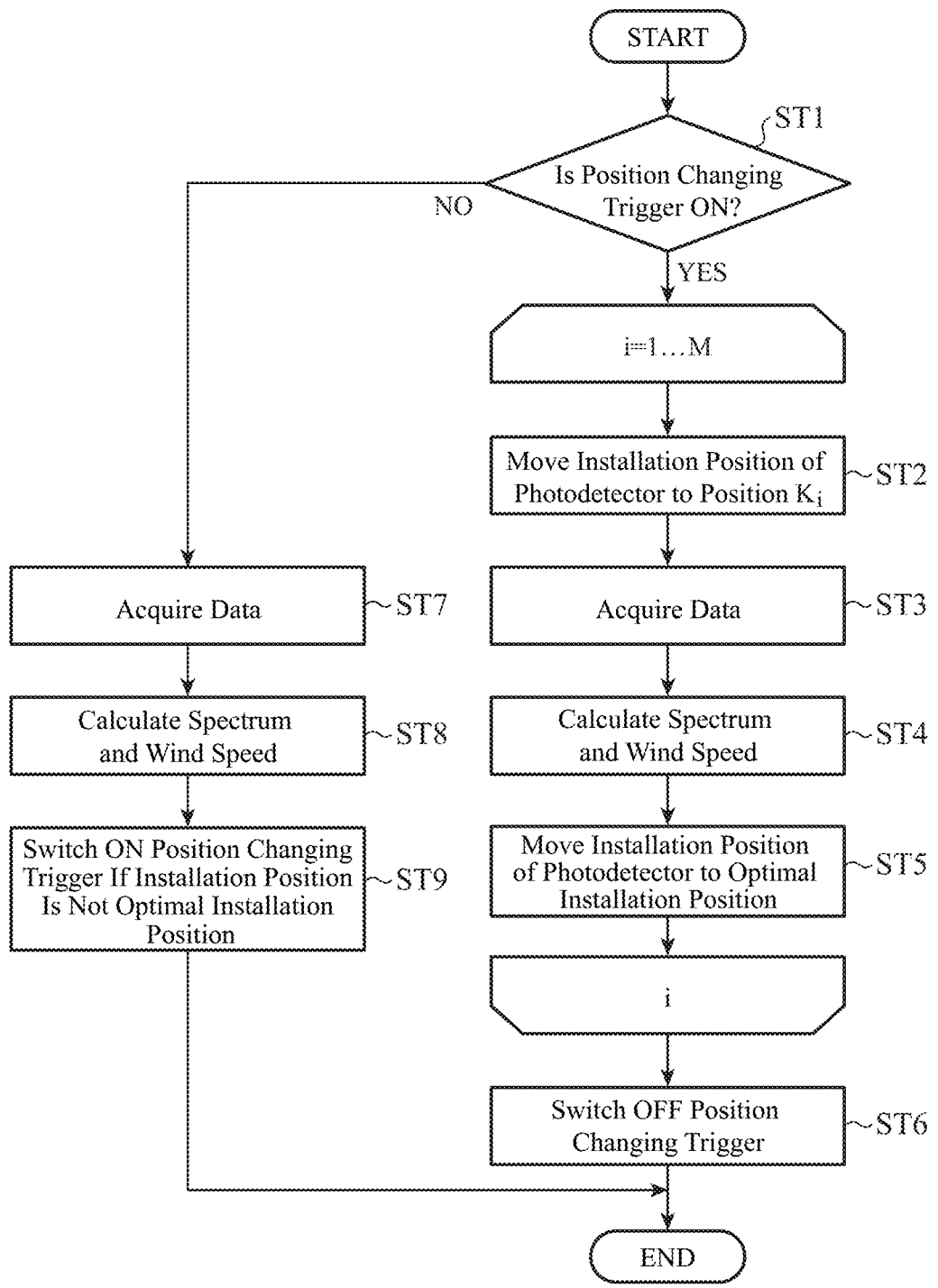
FIG. 3 is a flowchart showing the details of processing performed by the signal analyzing unit 9 of the radar device in accordance with Embodiment 1 of the present invention.

FIG. 3 is a flow chart showing the details of processing performed by the signal analyzing unit 9 of the radar device in accordance with Embodiment 1 of the present invention.

Next, the operation of the radar device will be explained.

Figure 5:
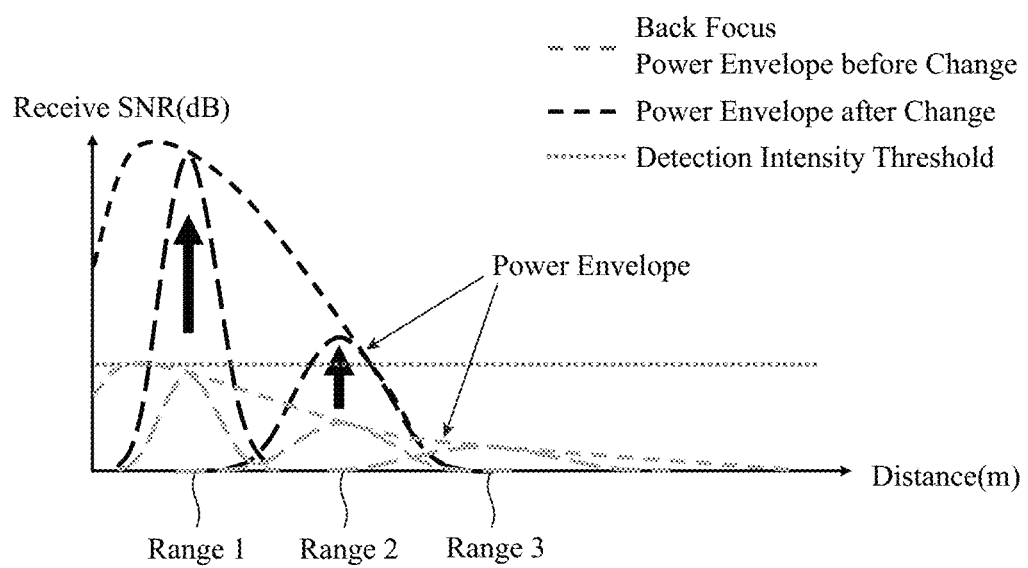
FIG. 5 is an explanatory drawing showing a power envelope before and after changed and a detection intensity threshold.

The laser device in accordance with this Embodiment 1 changes the shape of the envelope of a spectrum, as shown in FIG. 5, by changing the installation position of the photodetector 6 dynamically according to an environment such as the density of the aerosol 1.

By changing the shape of an envelope, the radar device can dynamically vary the receiving intensity of laser light reflected from the aerosol 1 located at a desired distance from the radar device. As a result, the radar device can measure a wind speed at a relatively short distance with a high receiving intensity and at a high data acquisition speed.

Hereafter, a reason why the receiving intensity can be increased by virtue of condensing will be explained.

A computation expression for a received SNR is disclosed by above-mentioned nonpatent reference 2, and is provided by the following equations (A) and (B).

$$SNR(R) = \frac{\eta_D(R) \lambda E \beta K_{atm}^{2R/1000} \pi D^2}{8hvBR^2} \quad (A)$$

$$\eta_D(R) = \frac{\eta^F}{\left\{1 + \left(1 - \frac{R}{z}\right)^2 \left[\frac{\pi(AcD)^2}{4\lambda R}\right]^2 + \left(\frac{AcD}{2S_0(R)}\right)^2\right\}} \quad (B)$$

In the equations (A) and (B), h denotes the Planck's constant (Js), v denotes the frequency of the light (Hz), $\lambda$ denotes the wavelength of the light (m), and B denotes a receiving bandwidth (Hz), and, when a Wideband SNR is calculated, is an entire analog receiving bandwidth.

Further, R denotes a target distance (m) which is the distance to the observation object to be measured, z denotes the focused distance (m), D denotes the effective aperture (m) of the optical system, E denotes the energy of a transmission pulse (J), $\beta$ denotes the atmospheric backscatter coefficient (/m/sr), and $K_{atm}$ denotes the atmospheric transmittance (/km).

In the equation (B), the inside of the brackets in the denominator is a term that determines the distance dependence of the reception coupling efficiency, a second term in the brackets relates to the curvature of the optical system (a focal distance setting), and a third term in the brackets relates to a fluctuation in the atmospheric air.

Further, $S_0$ denotes the transverse coherence length, $\eta^F$ denotes a coefficient for taking into consideration the influence of truncation of the transmission beam, and AcD denotes the diameter of the beam.

As can be seen from this equation, when the distance R of a certain target is measured, the received SNR is maximized by making the focused distance equal to the target distance R.

The optical oscillation unit 3 of the light transmitting and receiving unit 2 oscillates laser light, and outputs the laser light to the optical system 5 of the optical unit 4.

As a result, the laser light oscillated by the optical oscillation unit 3 is emitted into the atmospheric air by way of the optical system 5.

A part of the laser light emitted into the atmospheric air is reflected by the aerosol 1 existing in the atmospheric air and returns to the radar device.

The optical system 5 of the optical unit 4 receives the laser light which is reflected by the aerosol 1 existing in the atmospheric air and returns thereto.

The photodetector 6 of the optical unit 4 detects the laser light received by the optical system 5, and outputs data which is an electric signal corresponding to the signal intensity of the laser light to the signal analyzing unit 9 of the signal processing unit 8.

When receiving the data from the photodetector 6 of the optical unit 4, the signal analyzing unit 9 of the signal processing unit 8 calculates a spectrum by analyzing the data, and also calculates a wind speed as the speed of the aerosol 1.

Further, the signal analyzing unit 9 specifies an optimal installation position for the optical unit 4 by using spectra which the signal analyzing unit calculates by analyzing the output data of the optical unit 4 at different installation positions respectively, and controls the position adjustment made by the optical unit adjustment driving unit 7 so as to optimize the installation position of the optical unit 4.

Hereafter, the details of processing performed by the signal analyzing unit 9 will be explained concretely.

When a user operates a man-machine interface (e.g., a keyboard, a mouse, or the like) which is not illustrated to input a request to change the installation position of the photodetector 6, or when the data self-analysis unit 25, which will be mentioned below, outputs an adjustment command for adjusting the installation position, a position changing trigger is switched to "ON."

When the position changing trigger is in the "ON" state (step ST1 of FIG. 3), the optical condition setup and setup signal output unit 21 of the signal analyzing unit 9 outputs a setup signal $Es_i$ for adjusting the position where the photodetector 6 of the optical unit 4 is installed to the optical unit adjustment driving unit 7.

For example, in a case of adjusting the position where the photodetector 6 of the optical unit 4 is installed, when the distance (back focus) from the optical system 5 to the photodetector 6 is denoted by K, the optical condition setup and setup signal output unit outputs a setup signal $Es_i$ for moving the photodetector 6 from the initial position $K_0$ which is the closest to the optical system 5 to the position $K_M$ in order of $(K_0 \rightarrow K_1 \rightarrow K_2 \rightarrow \ldots \rightarrow K_M)$ to the optical unit adjustment driving unit 7 with reference to either the step having a constant interval or the table generated in advance, as shown in FIG. 4. In this case, i=0, 1, 2, . . . , M.

When receiving the setup signal $Es_i$ from the optical condition setup and setup signal output unit 21, the optical unit adjustment driving unit 7 moves the installation position of the photodetector 6 to the position of $K_i$ (step ST2).

After the optical unit adjustment driving unit 7 adjusts the installation position of the photodetector 6 from $K_{i-1}$ to $K_i$, the data acquiring unit 22 of the signal analyzing unit 9 acquires the data outputted from the photodetector 6 of the optical unit 4 (step ST3).

In this case, the data outputted from the photodetector 6 is an electric signal corresponding to the signal intensity of the laser light received by the optical system 5, and a Doppler effect has occurred in the laser light received by the optical system 5 according to the speed (wind speed) at the reflection position in the aerosol 1.

Every time when each data is outputted from the photodetector 6, the data acquiring unit 22 stores the signal intensity of the laser light which is shown by the data.

The spectrum and wind speed computing unit 23 of the signal analyzing unit 9 calculates a spectrum by analyzing time series data stored in the data acquiring unit 22, and also calculates a wind speed as the speed of the aerosol 1 (step ST4).

Hereafter, an example of a calculation method of calculating a wind speed will be explained.

Figure 15:
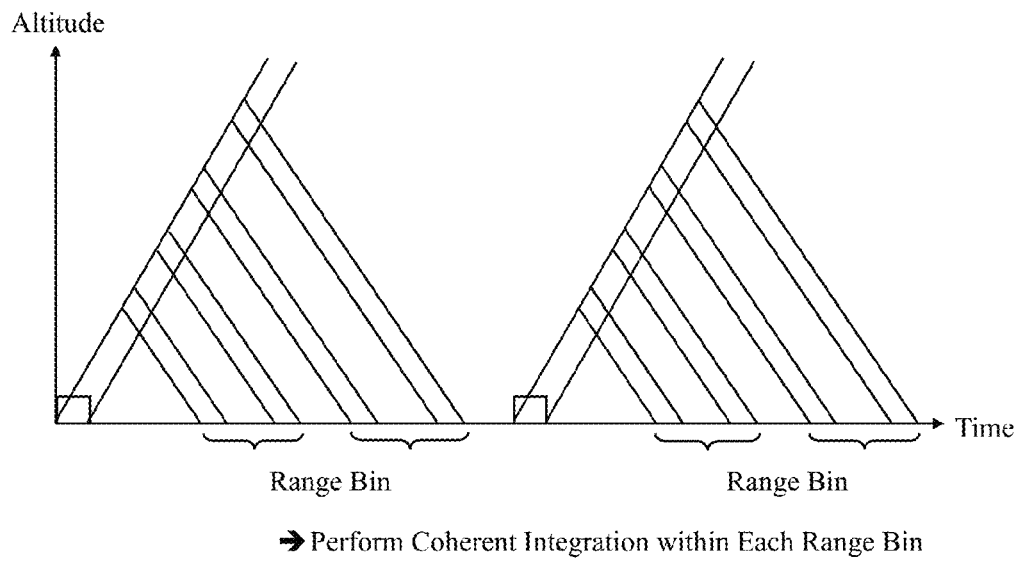
FIG. 15 is an explanatory drawing showing a coherent integration within each range bin.

First, the spectrum and wind speed computing unit 23 splits the signal intensity of the laser light which is shown by the time series data stored in the data acquiring unit 22 (the laser light reflected from the aerosol 1 in the atmospheric air at each altitude) into segments by time (laser light split by time is referred to as a "range bin"), and performs a coherent integration at very short intervals within each range bin, as shown in FIG. 15.

Figure 16:
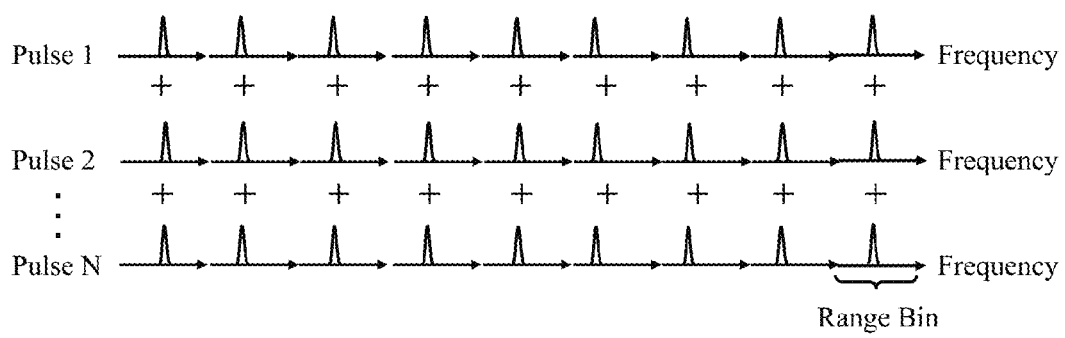
FIG. 16 is an explanatory drawing showing N incoherent integrations on a pulse in each range bin.
Figure 17:
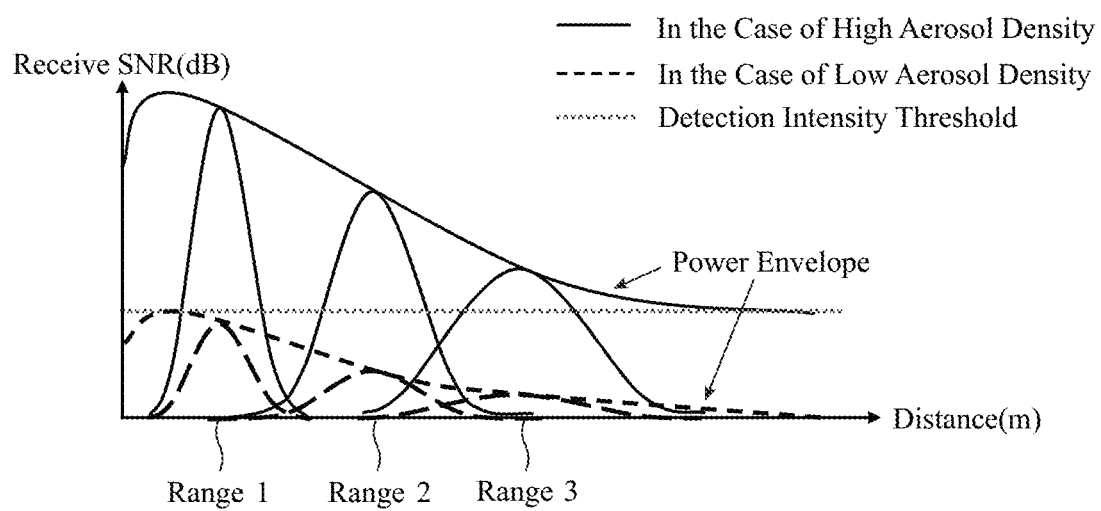
FIG. 17 is an explanatory drawing showing the dependence of a power envelope on an aerosol density.

After performing a coherent integration within each range bin, the spectrum and wind speed computing unit 23 performs a Fourier transform within the range bin, and, as shown in FIG. 16, performs N incoherent integrations on a pulse.

The number of integrations in the coherent integration and that in the incoherent integration will be mentioned below.

Further, the spectrum and wind speed computing unit 23 performs a coherent integration and an incoherent integration also on a signal including only noise in which no signal is mixed (referred to as a "noise signal" from here on) integration times whose number is the same as that of the above-mentioned integration within each range bin to acquire spectrum data. As an alternative, the spectrum and wind speed computing unit acquires a noise signal, which is a noise component, in real time.

The spectrum and wind speed computing unit 23 then calculates an SNR by dividing the result of the N incoherent integrations on a pulse by the noise signal.

Next, the spectrum and wind speed computing unit 23 calculates a Doppler speed (wind speed) having a predetermined SNR (a power spectrum having a predetermined detection intensity threshold or more) for each range bin, and holds the SNR as spectrum intensity.

The detection intensity threshold can be set by the user, or a value which is specific to the sensor and is determined can be used as the detection intensity threshold.

Every time when the optical condition setup and setup signal output unit 21 adjusts the installation position of the photodetector 6 (every time when the optical condition setup and setup signal output unit adjusts the installation position of the photodetector 6 from $K_{i-1}$ to $K_i$), the optimal position analysis unit 24 of the signal analyzing unit 9 determines whether or not the installation position $K_i$ after the adjustment is an optimal installation position by using the spectrum corresponding to the installation position $K_i$ after the adjustment when the spectrum and wind speed computing unit 23 calculates the spectrum.

After determining that the installation position $K_i$ after the adjustment is an optimal installation position, the optimal position analysis unit 24 outputs a control signal C for moving the installation position of the photodetector 6 (or the optical system 5) to the optimal installation position to the optical unit adjustment driving unit 7 (step ST5).

Hereafter, the details of processing performed by the optimal position analysis unit 24 will be explained concretely.

Figure 6:
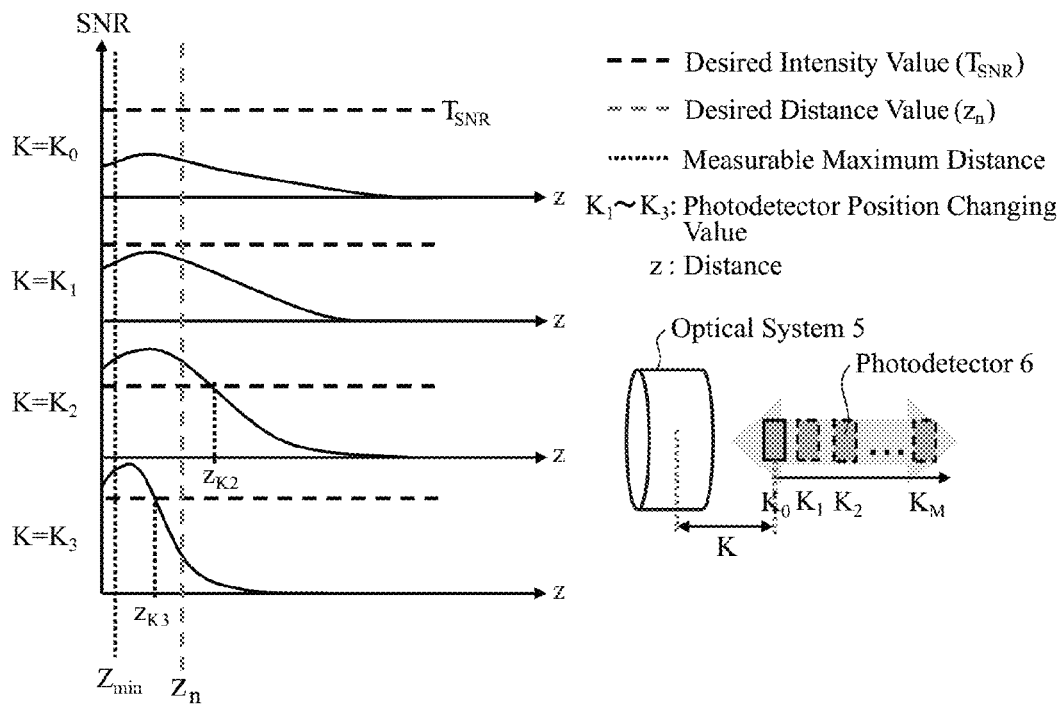
FIG. 6 is an explanatory drawing showing a relationship between a distance value Z and an SNR when the installation position of the photodetector 6 is $K_i$ (i=0, 1, 2, . . . , M)

FIG. 6 is an explanatory drawing showing a relationship between a distance value Z and the SNR when the installation position of the photodetector 6 is $K_i$ (i=0, 1, 2, . . . , M).

For example, when a desired intensity value set by the user is denoted by $T_{SNR}$ and a desired distance value set by the user is equal to or greater than $Z_n$, the optimal position analysis unit searches for an installation position $K_i$ of the photodetector 6 where a measurable distance having an intensity equal to or greater than the desired intensity value $T_{SNR}$ is equal to or longer than a minimum distance $Z_{min}$, and is further equal to or longer than the desired distance value $Z_n$.

More specifically, at an installation position $K_i$ of the photodetector 6, the optimal position analysis unit 24 compares a distance value $Z_k$ and the desired distance value $Z_n$, where the distance value of a point where the SNR crosses the desired intensity value $T_{SNR}$ for the first time after the distance value Z corresponding to the SNR exceeds the minimum distance $Z_{min}$ is denoted by $Z_k$, and, when the distance value $Z_k$ is equal to or greater than the desired distance value $Z_n$, determines the installation position $K_i$ as an optimal installation position.

In the example of FIG. 6, when the installation position $K_i$ of the photodetector 6 is moved to the position $K_2$, the distance value $Z_k$ becomes equal to or greater than the desired distance value $Z_n$, and the installation position $K_2$ is determined as an optimal installation position.

After determining the installation position $K_i$ as an optimal installation position, the optimal position analysis unit 24 outputs a control signal C for moving the installation position of the photodetector 6 to the optimal installation position $K_i$ to the optical unit adjustment driving unit 7.

When receiving the control signal C for moving the installation position of the photodetector 6 to the optimal installation position $K_i$ from the optimal position analysis unit 24, the optical unit adjustment driving unit 7 moves the installation position of the photodetector 6 to the optimal installation position $K_i$ shown by the control signal C.

Figure 7:
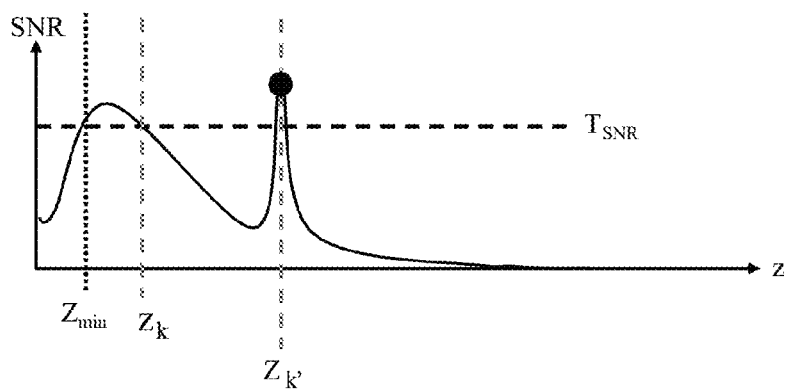
FIG. 7 is an explanatory drawing showing a power envelope acquired from the photodetector 6 when a clutter, such as a cloud, exists in atmospheric air.

For example, when a clutter, such as a cloud, exists in the atmospheric air, a power envelope as shown in FIG. 7 is acquired from the photodetector 6.

Supposing that a distance value at which a maximum of the SNR exceeds the desired intensity value $T_{SNR}$ is set as a criterion of the determination in the example of FIG. 7, $Z_k'$ which is a position marked with a black circle is determined as a measurable distance, though an actual measurable distance is $Z_k$.

In general, because a power envelope which is acquired only from the aerosol 1 in the atmospheric air is a smooth curved line, erroneous detection which determines the position $Z_k'$ as a measurable distance occurs when a distance value at which the maximum of the SNR exceeds the desired intensity value $T_{SNR}$ is set as a criterion of the determination.

In accordance with this Embodiment 1, because the minimum distance $Z_{min}$ is set, and there is additionally provided a condition that the distance value $Z_k$ of a point where the SNR crosses the desired intensity value $T_{SNR}$ for the first time after the distance value Z corresponding to the SNR exceeds the minimum distance $Z_{min}$ is equal to or greater than the desired distance value $Z_n$, the occurrence of erroneous detection as mentioned above can be prevented.

In this Embodiment 1, the example of, when the optical condition setup and setup signal output unit 21 adjusts the installation position of the photodetector 6 from $K_{i-1}$ to $K_i$, using the method (referred to as the method A from here on) of determining the installation position $K_i$ as an optimal installation position if the distance value $Z_k$ of a point where the SNR crosses the desired intensity value $T_{SNR}$ for the first time after the distance value Z corresponding to the SNR exceeds the minimum distance $Z_{min}$ is equal to or greater than the desired distance value $Z_n$ at the installation position $K_i$ of the photodetector 6 is shown. As an alternative, the radar device can use a method (referred to as a method B from here on) of, after the optical condition setup and setup signal output unit 21 moves the installation position of the photodetector 6 from the initial position $K_0$ to the position $K_M$ in order of $(K_0 \rightarrow K_1 \rightarrow K_2 \rightarrow \ldots \rightarrow K_M)$, making the optimal position analysis unit 24 specify an installation position of the photodetector 6 (or an installation position of the optical system 5) where the signal intensity of the laser light received by the optical system 5 is equal to or greater than the desired signal intensity by using a spectrum corresponding to each of the installation positions $(K_0, K_1, K_2, \ldots, K_M)$ first, and searching for an optimal installation position for the photodetector 6 (or the optical system 5) from among installation positions of the photodetector 6 (or installation positions of the optical system 5) where the signal intensity of the laser light is equal to or greater than the desired signal intensity (the details will be explained in Embodiment 3).

However, in the case of using the method A, because it is not necessary to analyze the output data of the photodetector 6 at positions far from the initial position $K_0$ if the optimal installation position is close to the initial position $K_0$, the optimal installation position can be determined more promptly compared with the case of using the method B.

In contrast, in the case of using the method B, there is a merit of being able to determine an installation position having a longer distance value as the optimal installation position when there are a plurality of installation positions of the photodetector 6 where the distance value $Z_k$ of a point where the SNR crosses the desired intensity value $T_{SNR}$ for the first time after the distance value Z corresponding to the SNR exceeds the minimum distance $Z_{min}$ is equal to or greater than the desired distance value $Z_n$.

After moving the installation position of the photodetector 6 (or the optical system 5) to the optimal installation position, the optimal position analysis unit 24 switches the position changing trigger to "OFF" (step ST6).

When the position changing trigger is switched to "OFF", the data acquiring unit 22 acquires the data outputted from the photodetector 6 which is installed at the optimal position (step ST7).

The spectrum and wind speed computing unit 23 calculates a spectrum by analyzing the data acquired by the data acquiring unit 22 and also calculates a wind speed as the speed of the aerosol 1 (step ST8).

Although a method of calculating a spectrum and a wind speed is the same as that used in the case in which the position changing trigger is in the "ON" state, the spectrum and wind speed computing unit can calculate a spectrum and a wind speed with a high degree of accuracy because the photodetector 6 is installed at the optimal position.

The display and storage unit 10 of the signal processing unit 8 stores the spectrum and the wind speed which are calculated by the signal analyzing unit 9, and also displays the spectrum and the wind speed.

After the spectrum and wind speed computing unit 23 calculates the spectrum, the data self-analysis unit 25 determines whether or not the signal intensity of the laser light received by the optical system 5 is equal to or greater than the desired signal intensity by using the spectrum (determines whether or not the installation position of the photodetector 6 is an optimal installation position), and, when the signal intensity of the laser light is not equal to or greater than the desired signal intensity, outputs an adjustment command for adjusting the installation position to the optical unit adjustment driving unit 7.

More specifically, the data self-analysis unit 25 calculates an SNR from the spectrum calculated by the spectrum and wind speed computing unit 23 (refer to the method of calculating an SNR which the spectrum and wind speed computing unit 23 uses as a method of calculating an SNR), and compares a distance value $Z_k$ and the desired distance value $Z_n$, where the distance value of a point where the SNR crosses the desired intensity value $T_{SNR}$ for the first time after the distance value Z corresponding to the SNR exceeds the minimum distance $Z_{min}$ is denoted by $Z_k$.

Then, when the distance value $Z_k$ is equal to or greater than the desired distance value $Z_n$, the data self-analysis unit maintains the position changing trigger in the "OFF" state because the installation position of the photodetector 6 is an optimal installation position even at the current time.

In contrast, because the installation position of the photodetector 6 is no longer an optimal installation position if the distance value $Z_k$ is less than the desired distance value $Z_n$, the data self-analysis unit switches the position changing trigger to "ON." As a result, the position adjustment of the installation position of the photodetector 6 is restarted.

As can be seen from the above description, the radar device in accordance with this Embodiment 1 is constructed in such a way that the optimal position analysis unit 24 specifies an optimal installation position for the photodetector 6 by using spectra which the spectrum and wind speed computing unit 23 calculates by analyzing the output data of the photodetector at different installation positions respectively, and controls the position adjustment made by the optical unit adjustment driving unit 7 so as to optimize the installation position of the photodetector 6, there is provided an advantage of being able to measure the speed of the aerosol 1 located at a desired distance in a short time with a high degree of accuracy.

More specifically, because the radar device in accordance with this Embodiment 1 does not vary the number of integrations in order to improve the SNR, the radar device can carry out wind measurements with a high SNR at a desired distance where the user desires to observe the speed without degrading the rate of the output data of the photodetector 6.

Although the example in which the optical condition setup and setup signal output unit 21 moves the installation position of the photodetector 6 from the initial position $K_0$ to the position $K_M$ ($K_0 \rightarrow K_1 \rightarrow K_2 \rightarrow \ldots \rightarrow K_M$) is shown in this Embodiment 1, the value of M can be defined by the user, or can be calculated by using the distance interval determined by the mechanism of the sensor, a minimum driving distance in the optical unit adjustment driving unit 7, and so on.

Although the example in which the minimum distance $Z_{min}$ is set is shown in this Embodiment 1, the minimum distance $Z_{min}$ can be defined by the user. For example, a value which is determined theoretically, such as the position of a peak of the efficiency which is determined by the defocus position, can be used.

Although the example in which the light transmitting and receiving unit 2 is comprised of the optical oscillation unit 3, the optical unit 4, and so on is shown in this Embodiment 1, the light transmitting and receiving unit has only to measure a Doppler speed such as a wind speed. The light transmitting and receiving unit 2 can have another structure. For example, the light transmitting and receiving unit can have a structure as disclosed in patent reference 1.

Embodiment 2

Although the example in which the optical unit adjustment driving unit 7 that adjusts the position where the optical unit 4 is installed according to a command from the signal analyzing unit 9 is disposed, and the optimal position analysis unit 24 specifies an optimal installation position for the photodetector 6 by using spectra which the spectrum and wind speed computing unit 23 calculates by analyzing the output data of the photodetector 6 at different installation positions respectively, and controls the position adjustment made by the optical unit adjustment driving unit 7 so as to optimize the installation position of the photodetector 6 is shown in above-mentioned Embodiment 1, an optical condition adjuster that adjusts the focus of an optical system 5 (an optical condition) can be alternatively disposed, and an optimal position analysis unit 24 can specify an optimal focus (optimal optical condition) for the optical system 5 by using spectra which a spectrum and wind speed computing unit 23 calculates by analyzing output data of a photodetector 6 at different focuses (under different optical conditions) of the optical system 5 respectively, and controls the focus adjustment made by the above-mentioned optical condition adjuster so as to optimize the focus (optical condition) of the optical system 5.

For example, in a case in which the optical system 5 is comprised of a group of plural lenses, a mechanism for extending a focus lens in the lens group can be considered as the optical condition adjuster.

The optimal position analysis unit 24 in accordance with this Embodiment 2 is fundamentally the same as the optimal position analysis unit 24 in accordance with above-mentioned Embodiment 1.

More specifically, while the optimal position analysis unit 24 in accordance with above-mentioned Embodiment 1 determines whether or not an installation position $K_i$ after adjustment is an optimal installation position by using a spectrum corresponding to the installation position $K_i$ after the adjustment every time when the optical unit adjustment driving unit 7 adjusts the installation position of the photodetector 6 from $K_{i-1}$ to $K_i$ under a command from the optical condition setup and setup signal output unit 21, the optimal position analysis unit 24 in accordance with this Embodiment differs from that in accordance with above-mentioned Embodiment 1 only in that the optimal position analysis unit determines whether or not a focus $F_i$ after adjustment is an optimal focus by using a spectrum corresponding to the focus $F_i$ after the adjustment every time when the optical condition adjuster adjusts the focus of the optical system 5 from $F_{i-1}$ to $F_i$ under a command from an optical condition setup and setup signal output unit 21.

The determination of whether or not the focus after the adjustment is an optimal focus is performed, for example, as follows.

The optimal position analysis unit 24 compares a distance value $Z_k$ and a desired distance value $Z_n$, where the distance value of a point where the SNR crosses a desired intensity value $T_{SNR}$ for the first time after a distance value Z corresponding to the SNR exceeds a minimum distance $Z_{min}$ at the focus $F_i$ of the optical system 5 is denoted by $Z_k$, and, when the distance value $Z_k$ is equal to or greater than the desired distance value $Z_n$, determines the focus $F_i$ as an optimal focus.

After determining the focus $F_i$ as an optimal focus, the optimal position analysis unit 24 outputs a control signal C for adjusting the focus of the optical system 5 to the optimal focus $F_i$ to the optical condition adjuster.

Accordingly, the optical condition adjuster adjusts the focus of the optical system 5 to the optimal focus $F_i$.

As a result, this embodiment provides an advantage of being able to measure the speed of an aerosol 1 located at a desired distance in a short time with a high degree of accuracy, like above-mentioned Embodiment 1.

Although the example in which the optical condition adjuster adjusts the focus of the optical system 5 instead of adjusting the installation position of the photodetector 6 by means of the optical unit adjustment driving unit 7 is shown in this Embodiment 2, the optical unit adjustment driving unit 7 can adjust the installation position of the photodetector 6 while the optical condition adjuster can adjust the focus of the optical system 5.

Embodiment 3

Figure 8:
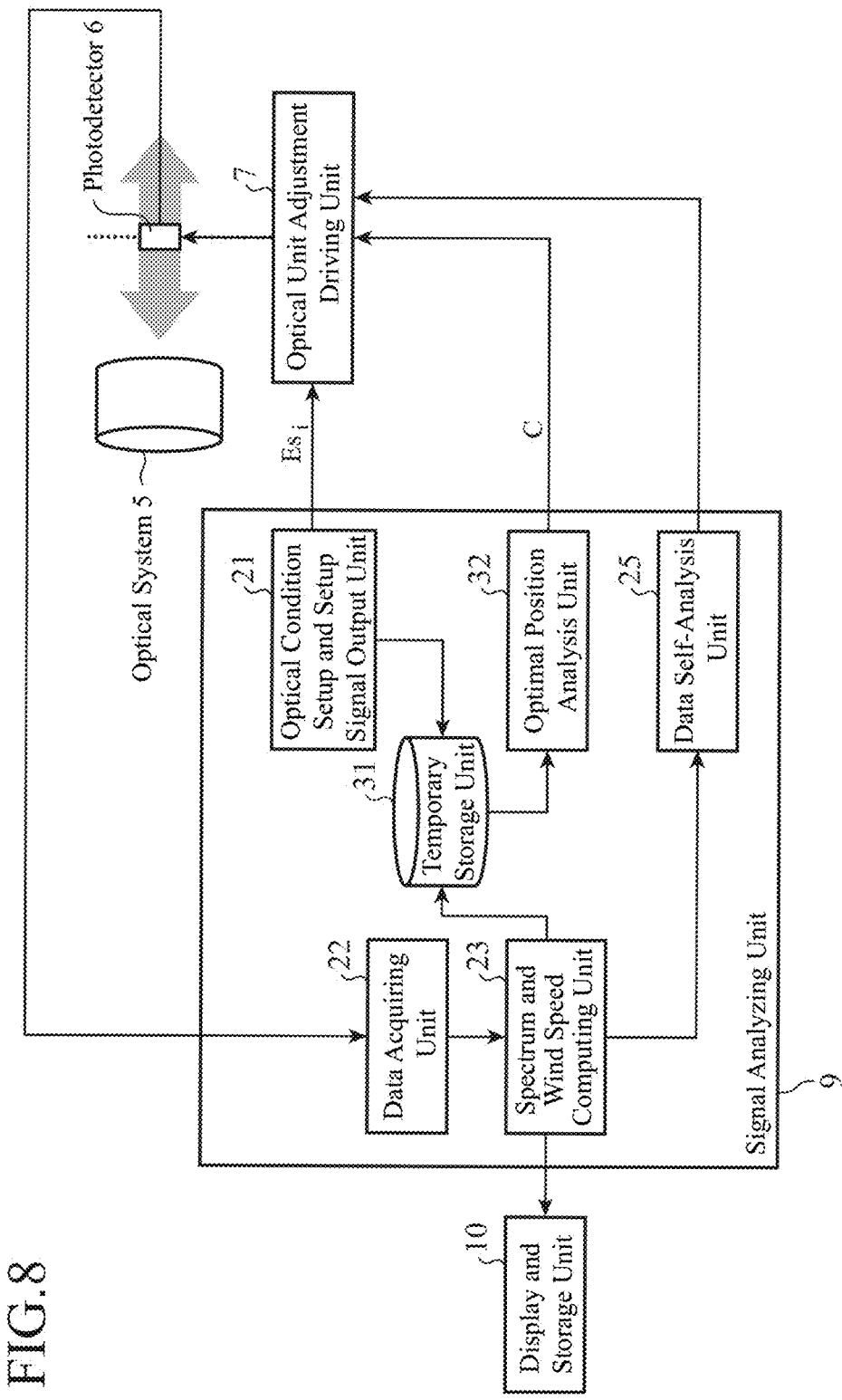
FIG. 8 is a structural diagram showing a signal analyzing unit 9 of a radar device in accordance with Embodiment 3 of the present invention.

FIG. 8 is a structural diagram showing a signal analyzing unit 9 of a radar device in accordance with Embodiment 3 of the present invention. In the figure, because the same reference numerals as those shown in FIG. 2 denote the same components or like components, the explanation of the components will be omitted hereafter.

A temporary storage unit 31 is comprised of a storage unit, such as a RAM or a hard disk. Every time when an optical unit adjustment driving unit 7 adjusts the installation position of a photodetector 6 (or the installation position of an optical system 5), the temporary storage unit stores a spectrum calculated by a spectrum and wind speed computing unit 23, and also stores the installation position of the photodetector 6 (or the installation position of the optical system 5) at the time when the spectrum is calculated. The temporary storage unit 31 constructs a storage.

An optimal position analysis unit 32 performs a process of searching through one or more installation positions of the photodetectors 6 (or installation positions of the optical system 5) stored in the temporary storage unit 31 for an optimal installation position for the photodetector 6 (or the optical system 5) by using one or more spectra stored in the temporary storage unit 31.

Further, the optimal position analysis unit 32 performs a process of outputting a control signal C for moving the installation position of the photodetector 6 (or the installation position of the optical system 5) to the optimal installation position to an optical unit adjustment driving unit 7.

The optimal position analysis unit 32 constructs an installation position optimizer.

Next, the operation of the radar device will be explained.

Because the components other than the temporary storage unit 31 and the optimal position analysis unit 32 are the same as those in accordance with above-mentioned Embodiment 1, the details of processing performed by the temporary storage unit 31 and the optimal position analysis unit 32 will be explained mainly.

The example in which the optimal position analysis unit 24 determines whether or not the installation position of the photodetector 6 after movement is an optimal installation position every time when the installation position of the photodetector 6 is moved once is shown in above-mentioned Embodiment 1. In contrast, in accordance with this Embodiment 3, an optical condition setup and setup signal output unit 21 moves the installation position of the photodetector 6 from an initial position $K_0$ to a position $K_M$ in order of ($K_0 \rightarrow K_1 \rightarrow K_2 \rightarrow \ldots \rightarrow K_M$) first, and a spectrum and wind speed computing unit 23 calculates a spectrum from the output data of the photodetector 6 at each of the installation positions ($K_0, K_1, K_2, \ldots, K_M$), and stores the spectrum at each of the installation positions ($K_0, K_1, K_2, \ldots, K_M$) in the temporary storage unit 31.

The optimal position analysis unit 32 specifies installation positions of the photodetector 6 (or installation positions of the optical system 5) where the signal intensity of laser light received by the optical system 5 is equal to or greater than a desired signal intensity by using the spectrum corresponding to each of the installation positions ($K_0, K_1, K_2, \ldots, K_M$) which is stored in the temporary storage unit 31, and searches through the installation positions of the photodetector 6 (or the installation positions of the optical system 5) where the signal intensity of the laser light is equal to or greater than the desired signal intensity for an optimal installation position for the photodetector 6 (or the optical system 5).

More specifically, the optimal position analysis unit 32 compares a distance value $Z_k$ and a desired distance value $Z_n$, where the distance value of a point where the SNR crosses a desired intensity value $T_{SNR}$ for the first time after the distance value Z corresponding to the SNR exceeds a minimum distance $Z_{min}$ at each of the installation positions ($K_0, K_1, K_2, \ldots, K_M$) is denoted by $Z_k$, to determine whether or not the distance value $Z_k$ is equal to or greater than the desired distance value $Z_n$.

When one or more installation positions where the distance value $Z_k$ is equal to or greater than the desired distance value $Z_n$ exist, the optimal position analysis unit 32 determines, as an optimal installation position, the installation position $K_i$ having the largest distance value $Z_k$ from among the one or more installation positions.

After determining the installation position $K_i$ as an optimal installation position, the optimal position analysis unit 32 outputs a control signal C for moving the installation position of the photodetector 6 to the optimal installation position $K_i$ to the optical unit adjustment driving unit 7.

Figure 9:
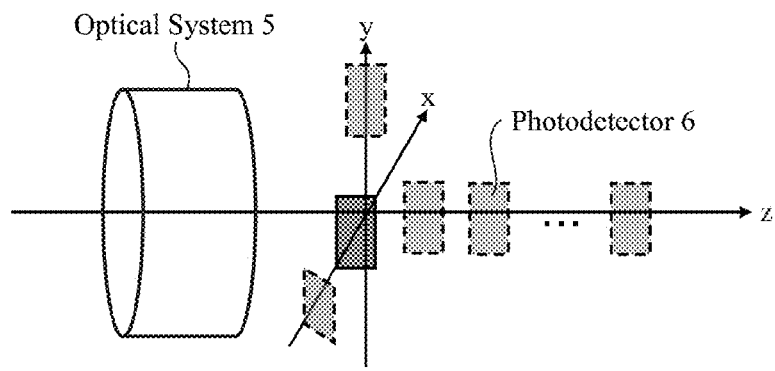
FIG. 9 is an explanatory drawing showing a case in which a photodetector 6 is displaced from a z axis due to a disturbance such as a vibration.

Hereafter, as an example which can utilize the structure shown in FIG. 8 to the utmost, there can be provided an example of being able to determine the installation position $K_i$ of the photodetector 6 as an optimal installation position even when the photodetector 6 is displaced from a z axis due to a disturbance such as a vibration, as shown in FIG. 9.

Figure 10:
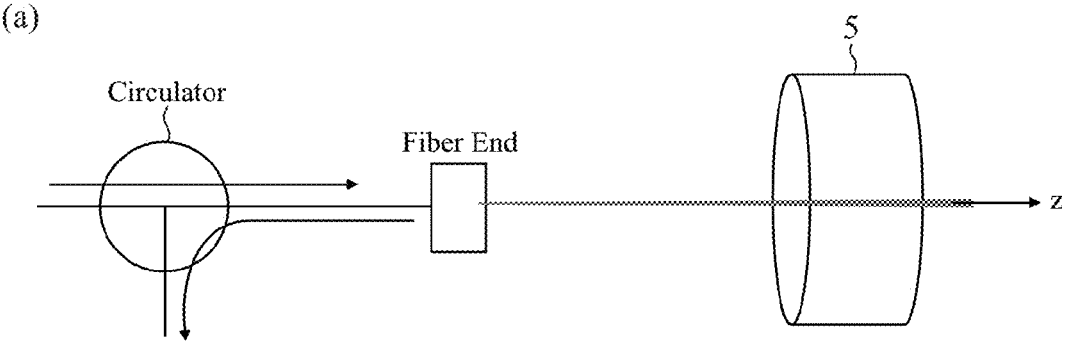
FIG. 10 is an explanatory drawing showing the structure of a light transmitting and receiving unit 2 of the radar device.
Figure 10:
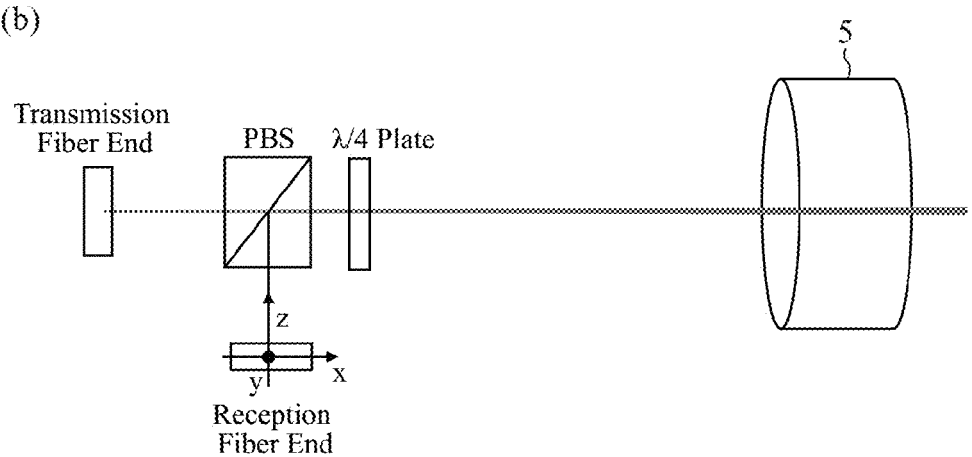

In a case in which a light transmitting and receiving unit 2 of the radar device has a structure as shown in FIG. 10(*a*), the receiving surface is displaced only in a direction of the z axis even when receiving a disturbance, such as a vibration, because an identical fiber is provided for fiber transmission and reception. Therefore, optimization can be carried out through an adjustment in the direction of the z axis, like in the case of above-mentioned Embodiment 1.

However, it is known that in a case in which the light transmitting and receiving unit 2 of the radar device has a non-transmission/reception integrated structure as shown in FIG. 10(*b*), the receiving surface is displaced not only in a direction of the z axis but also in directions of the x and y axes due to a disturbance such as a vibration.

Figure 24:
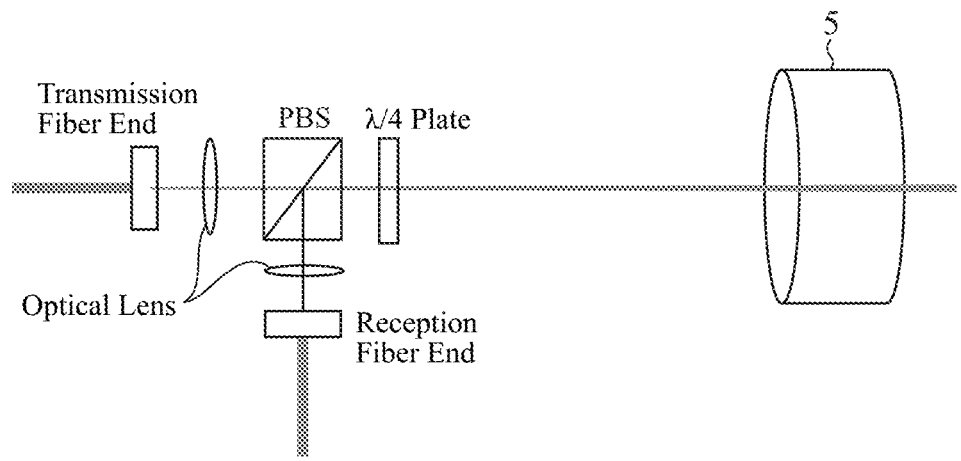
FIG. 24 is an explanatory drawing showing another example of an optical circulator.

It is further known that also in a case in which an optical circulator 5 in the light transmitting unit 2 has a structure as shown in FIG. 24, the receiving surface is displaced not only in a direction of the z axis but also in directions of the x and y axes due to a disturbance such as a vibration.

Therefore, although the variable for the installation position $K_i$ of the photodetector 6 is only i in above-mentioned Embodiment 1, a variable (p, q, r) corresponding to the x, y, and z axes is used as the variable for the installation position of the photodetector 6 in this Embodiment 3, and a data acquiring unit 22 acquires the output data of the photodetector 6 while the photodetector is displaced numbers of times (P, Q, R) with respect to the x, y, and axes and the spectrum and wind speed computing unit 23 analyzes the data acquired by the data acquiring unit 22 to calculate a spectrum corresponding to the variable (p, q, r).

The numbers of times (P, Q, R) can be determined by the user in the same way that the variable i is defined. For example, the number of times which is determined by a minimum driving distance and the equipment configuration of the optical unit adjustment driving unit 7 can be used.

The optimal position analysis unit 32 calculates the SNR of the spectrum corresponding to the variable (p, q, r) which is stored in the temporary storage unit 31, generates a four-dimensional map of the SNR corresponding to the variable (p, q, r) and the SNR at the desired distance value set by the user, and outputs, as an optimal installation position, an installation position corresponding to the variable (p, q, r) at the time when the SNR is the highest to the optical unit adjustment driving unit 7.

As an alternative, the optimal position analysis unit generates a four-dimensional map of the variable (p, q, r) and a maximum measurement distance exceeding a detection intensity threshold set by the user, and outputs, as an optimal installation position, an installation position corresponding to the variable (p, q, r) at the time when the maximum measurement distance on the four-dimensional map is the longest to the optical unit adjustment driving unit 7.

As a result, because the installation position $K_i$ of the photodetector 6 can be determined as an optimal installation position even when the photodetector 6 is displaced from the z axis due to a disturbance such as a vibration, there is provided an advantage of being able to carry out a more stable wind measurement.

Although the example in which the temporary storage unit 31 that, every time when the optical unit adjustment driving unit 7 adjusts the installation position of the photodetector 6, stores a spectrum calculated by the spectrum and wind speed computing unit 23, and also stores the installation position of the photodetector 6 at the time when the spectrum is calculated is disposed, and the optimal position analysis unit 32 searches through one or more installation positions of the photodetector 6 stored in the temporary storage unit 31 for an optimal installation position for the photodetector 6 by using one or more spectra stored in the temporary storage unit 31, and outputs a control signal for moving the installation position of the photodetector 6 to the optimal installation position to the optical unit adjustment driving unit 7 is shown in this Embodiment 3, a temporary storage unit that, every time when the above-mentioned optical condition adjuster adjusts the focus of the optical system 5, stores a spectrum calculated by the spectrum and wind speed computing unit 23, and also stores the focus of the optical system 5 at the time when the spectrum is calculated can be alternatively disposed, and the optimal position analysis unit can search through one or more focuses of the optical system 5 stored in the temporary storage unit for an optimal focus for the optical system 5 by using one or more spectra stored in the temporary storage unit.

Embodiment 4

Figure 11:
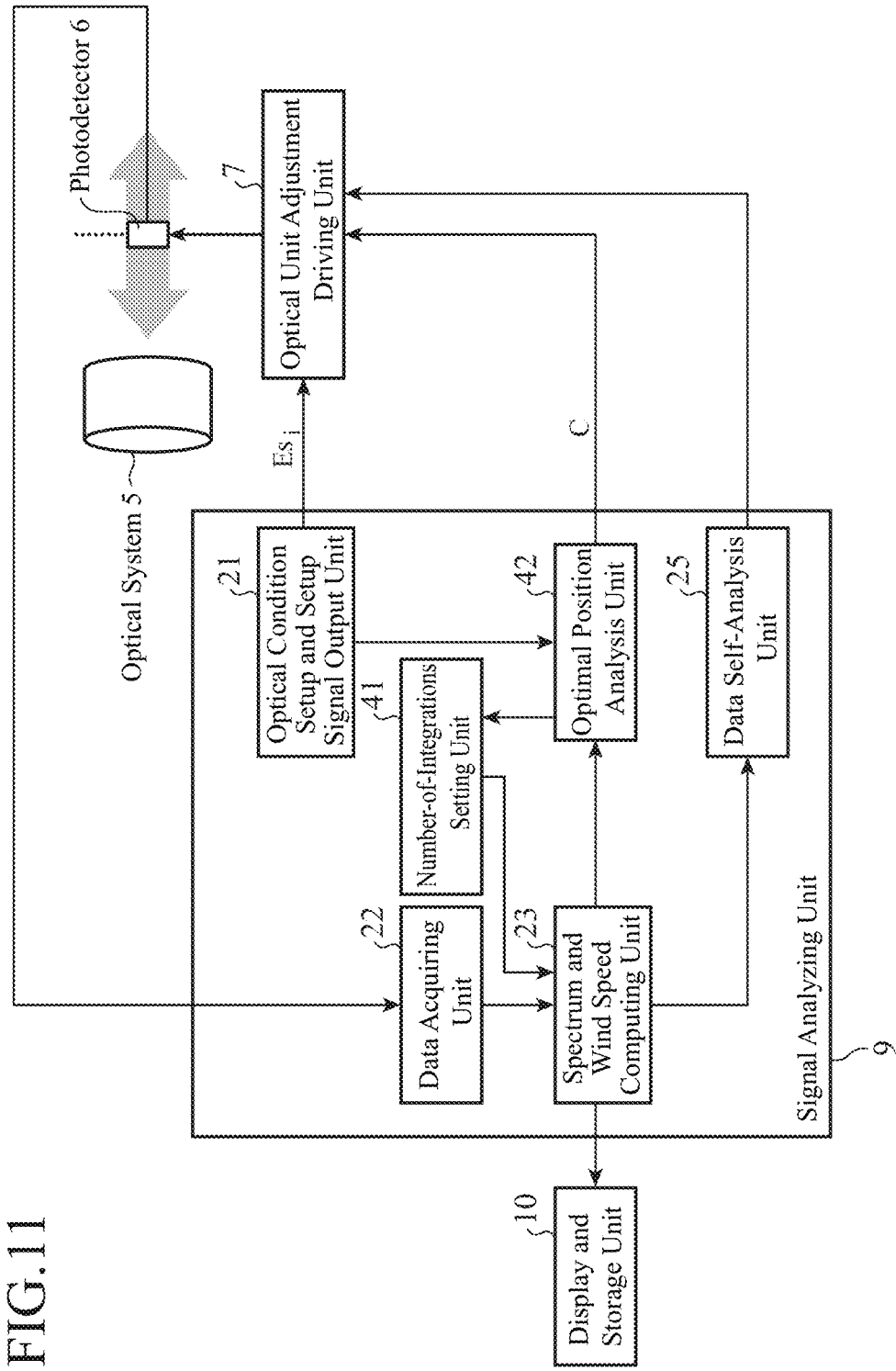
FIG. 11 is a structural diagram showing a signal analyzing unit 9 of a radar device in accordance with Embodiment 4 of the present invention.

FIG. 11 is a structural diagram showing a signal analyzing unit 9 of a radar device in accordance with Embodiment 4 of the present invention. In the figure, because the same reference numerals as those shown in FIG. 2 denote the same components or like components, the explanation of the components will be omitted hereafter.

A number-of-integrations setting unit 41 performs a process of, when a spectrum and wind speed computing unit 23 splits time series data outputted from a photodetector 6 into range bins, and calculates a wind speed by performing integration processing within each of the range bins, setting up the number of integrations in the integration processing within each of the range bins. The number-of-integrations setting unit 41 constructs a number-of-integrations setter.

An optimal position analysis unit 42 searches for an optimal installation position for the photodetector 6 (or an optical system 5) by using the same method as that which the optimal position analysis unit 24 of FIG. 2 (or the optimal position analysis unit 32 of FIG. 8) uses, and, at that time, performs a process of searching for an optimal installation position for the photodetector 6 (or the optical system 5) while controlling not only the installation position of the photodetector 6 (or the optical system 5) but also the number of integrations set by the number-of-integrations setting unit 41. The optimal position analysis unit 42 constructs an installation position optimizer.

Although the example of searching for an optimal installation position for the photodetector 6 (or the optical system 5) while moving the installation position of the photodetector 6 (or the optical system 5) is shown in above-mentioned Embodiments 1 and 3, there is a case in which no optimal installation position is found even if the installation position of the photodetector 6 is moved from an initial position $K_0$ to a position $K_M$ ($K_0 \rightarrow K_1 \rightarrow K_2 \rightarrow K_M$). More specifically, there are also a case in which an installation position of the photodetector 6 where the receive SNR exceeds a desired intensity value $T_{SNR}$ is not found, and a case in which an installation position of the photodetector 6 where the distance value $Z_k$ of a point where the SNR crosses the desired intensity value $T_{SNR}$ for the first time is equal to or greater than a desired distance value $Z_n$ is not found.

Therefore, in accordance with this Embodiment 4, the number-of-integrations setting unit 41 that sets the number of integrations of the integration processing in the spectrum and wind speed computing unit 23 is disposed, and, if no optimal installation position is found even if the installation position of the photodetector 6 is moved from the initial position $K_0$ to the position $K_M$ ($K_0 \rightarrow K_1 \rightarrow K_2 \rightarrow \ldots \rightarrow K_M$), the optimal position analysis unit 42 increases the number of integrations gradually by outputting a command for increasing the number of integrations to the number-of-integrations setting unit 41.

Because the receive SNR is improved with increase in the number of integrations of the integration processing in the spectrum and wind speed computing unit 23, the receive SNR exceeds the desired intensity value $T_{SNR}$, and, as a result, the possibility that an optimal installation position is found increases.

An upper limit on the number of integrations can be set by the user, or can be held in a sensor. Further, the upper limit can be determined according to the amount of memory for holding the data, but is not limited to this example.

As described in above-mentioned Embodiment 3, in the case of any of above-mentioned Embodiments 1 and 2, by varying the focused distance by moving the focused position of the transmission beam and that of the received beam together though movement of the fiber end 106 in the state of a coaxial structure for transmission/reception, the position of the fiber end 106 is set in such a way that a distance at which the SNR equal to or higher than a threshold can be acquired is the farthest.

Figure 19:
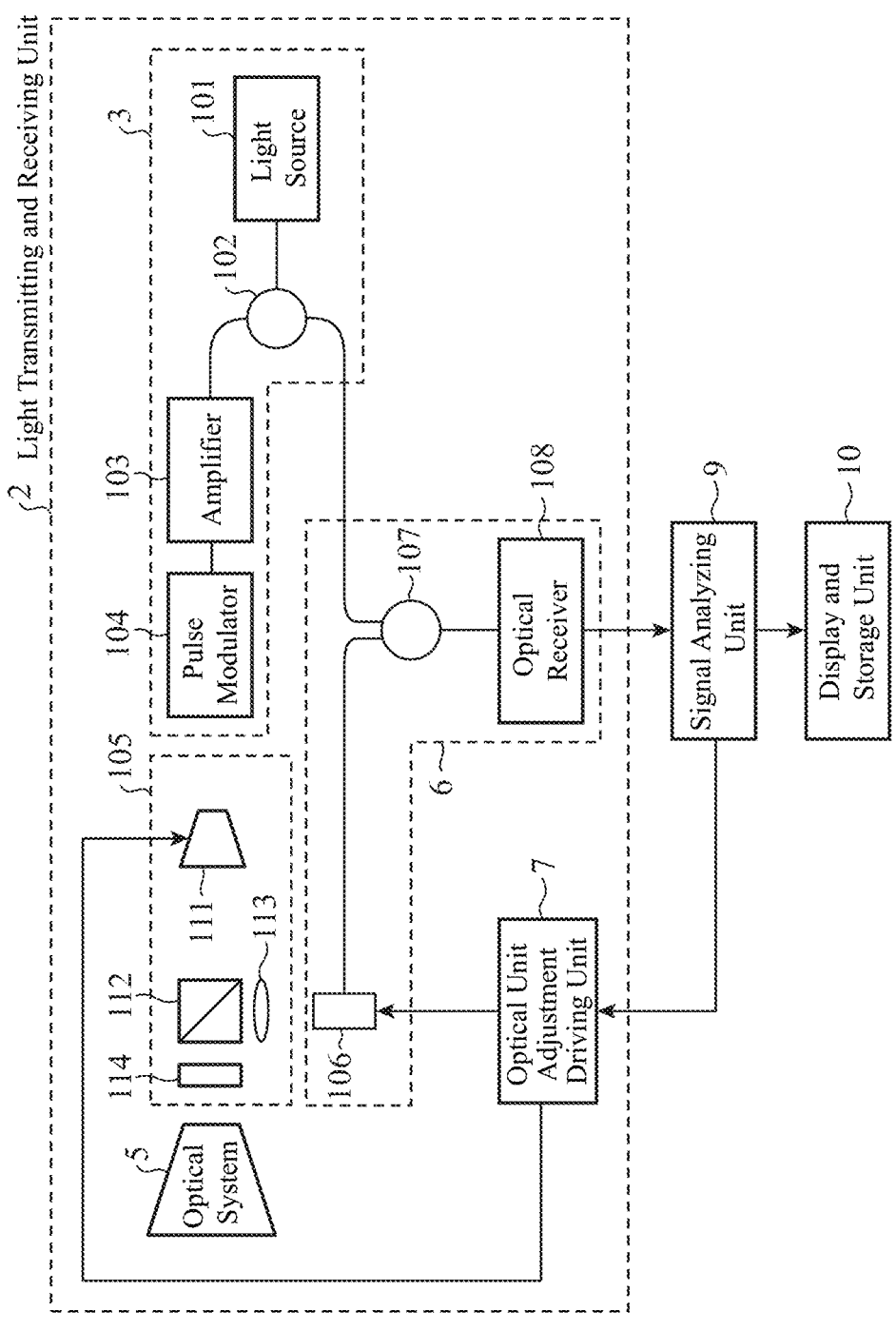
FIG. 19 is a structural diagram showing the details of the light transmitting and receiving unit 2 shown in FIG. 1.

However, in a case in which an optical circulator 105 has a structure as shown in FIG. 19, the focused distance of the transmission beam and that of the received beam can be moved separately.

In the example of FIG. 19, laser light is outputted from a pulse modulator 104 of an optical oscillation unit 3 to space.

Further, the optical circulator 105 is comprised of a transmission beam adjustment optical system 111, a PBS 112 which is a polarization beam splitter, an optical lens 113, and a λ/4 plate 114.

In this case, as the transmission beam adjustment optical system 111, for example, there is a zoom beam expander. A structure of varying the focused distance by adding an external mechanism to this beam expander, and making an optical unit adjustment driving unit 7 control the beam expander can be considered.

This structure is used typically in a case in which the optical power from the pulse modulator 104 is large.

In the case of this structure, one or both of the transmission beam adjustment optical system 111 and the fiber end 106 are operated, and an adjustment state of the transmission beam adjustment optical system 111 and a position of the fiber end 106 where the distance at which the SNR equal to or higher than the threshold can be acquired is the farthest are searched for in the same way as above.

There can be a case in which when, for example, the optical power from the pulse modulator 104 is large, the focused distance of the transmission beam differs from that of the received beam and therefore the receive SNR degrades because a parameter affecting an optical condition, such as temperature, differs greatly between transmission and reception. However, by separately providing a function of adjusting the adjustment state of the transmission beam adjustment optical system 111 and a function of adjusting the position of the fiber end 106, as mentioned above, both the transmission beam and the received beam can be focused to intended distances respectively. Further, by varying the focused distances in this state in the same way as that shown in any of above-mentioned Embodiments 1 and 2, the same advantages as those provided by any of above-mentioned Embodiments 1 and 2 can be provided.

In accordance with this Embodiment 4, there is provided an advantage of, even when an optimal installation position for the photodetector 6 (or the optical system 5) cannot be searched for merely by moving the installation position of the photodetector 6 (or the optical system 5), being able to search for an optimal installation position and measure the speed of an aerosol 1 located at a desired distance in a short time with a high degree of accuracy.

However, when no optimal installation position can be searched for even if the number of integrations of the integration processing in the spectrum and wind speed computing unit 23 is increased, for example, a message for making a request to change a condition, such as a request to lower the desired SNR, can be displayed on a display and storage unit 10.

There is a case in which the radar device can search for an optimal installation position when the user looks at this message and then changes the condition. Therefore, the efficiency of parameter tuning by the user can be improved.

Although the example in which the optimal position analysis unit 42 searches for an optimal installation position for the photodetector 6 (or the optical system 5) while controlling the number of integrations set by the number-of-integrations setting unit 41 is shown in this Embodiment 4, the optimal position analysis unit 42 can alternatively search for an optimal focus for the optical system 5 by using the same method as that shown in above-mentioned Embodiment 2 while controlling the number of integrations set by the number-of-integrations setting unit 41.

Embodiment 5

Figure 12:
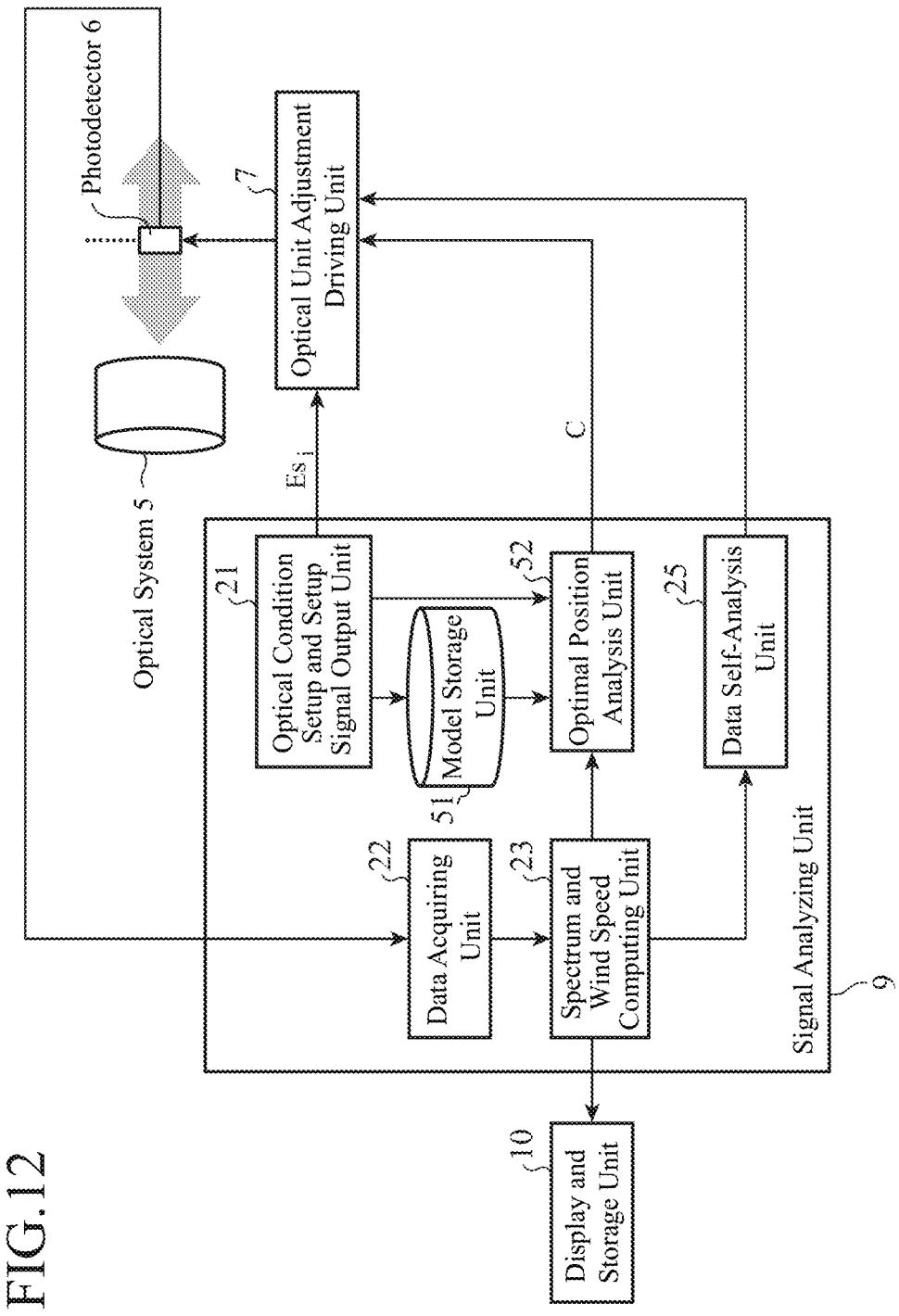
FIG. 12 is a structural diagram showing a signal analyzing unit 9 of a radar device in accordance with Embodiment 5 of the present invention.

FIG. 12 is a structural diagram showing a signal analyzing unit 9 of a radar device in accordance with Embodiment 5 of the present invention. In the figure, because the same reference numerals as those shown in FIG. 2 denote the same components or like components, the explanation of the components will be omitted hereafter.

A model storage unit 51 is comprised of a storage, such as a RAM or a hard disk, and stores a model of an envelope function in a spectrum. The model storage unit 51 constructs a model storage.

An optimal position analysis unit 52 performs a process of comparing the envelope of a spectrum calculated by a spectrum and wind speed computing unit 23, and an envelope acquired from the model stored in the model storage unit 51, reconstructing a model under a current environment in which an aerosol 1 exists, and controlling a position adjustment made by an optical unit adjustment driving unit 7 by using the model. The optimal position analysis unit 52 constructs an installation position optimizer.

Although a signal analyzing unit 9 of FIG. 12 having a structure in which the model storage unit 51 and the optimal position analysis unit 52 are added to the signal analyzing unit 9 of FIG. 2 is shown, the signal analyzing unit can alternatively have a structure in which the model storage unit 51 and the optimal position analysis unit 52 are added to the signal analyzing unit 9 of FIG. 8 or 11.

Next, the operation of the radar device will be explained.

Because the components other than the model storage unit 51 and the optimal position analysis unit 52 are the same as those in accordance with above-mentioned Embodiment 1, the details of processing performed by the model storage unit 51 and the optimal position analysis unit 52 will be mainly explained hereafter.

First, the spectrum and wind speed computing unit 23 calculates a spectrum by acquiring output data of a photodetector 6 at an arbitrary installation position of a photodetector 6 (or an optical system 5). The arbitrary installation position can be anywhere as long as the arbitrary installation position is the one where a receiving intensity spectrum can be acquired. As an alternative, the arbitrary installation position can be a focal distance by default.

Both the envelope (power envelope) of the spectrum calculated by the spectrum and wind speed computing unit 23 and the model stored in the model storage unit 51 are provided for the optimal position analysis unit 52.

Figure 13:
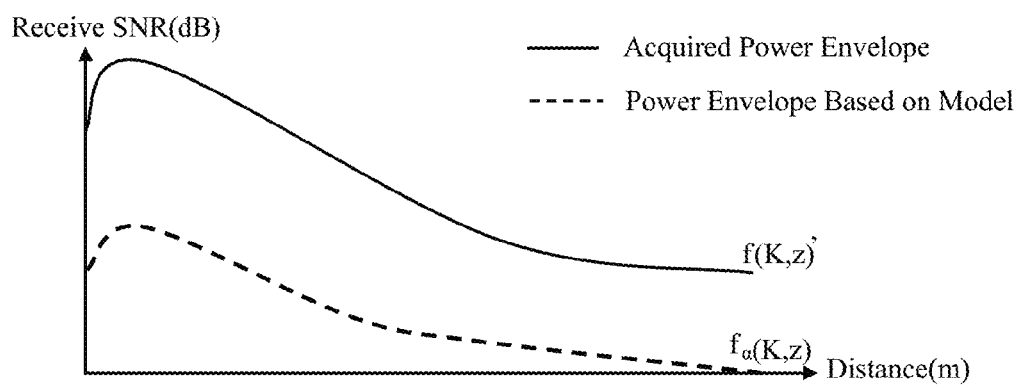
FIG. 13 is an explanatory drawing showing the envelope of a spectrum calculated by a spectrum and wind speed computing unit 23, and an envelope acquired from a model stored in a model storage unit 51.

FIG. 13 is an explanatory drawing showing the envelope of the spectrum calculated by the spectrum and wind speed computing unit 23, and the envelope acquired from the model stored in the model storage unit 51.

In FIG. 13, the envelope calculated by the spectrum and wind speed computing unit 23 is expressed by f(K, z)', and is shown by a solid line.

Further, the envelope acquired from the model stored in the model storage unit 51 is expressed by $f_\alpha(K, z)$, and is shown by a broken line.

This embodiment is predicated on (1) and (2) which will be mentioned below.

(1) The density of the aerosol 1 is constant.

(2) The power envelope varies linearly with respect to the density of the aerosol 1.

As the model stored in the model storage unit 51, for example, a model as shown below can be considered.

Figure 14:
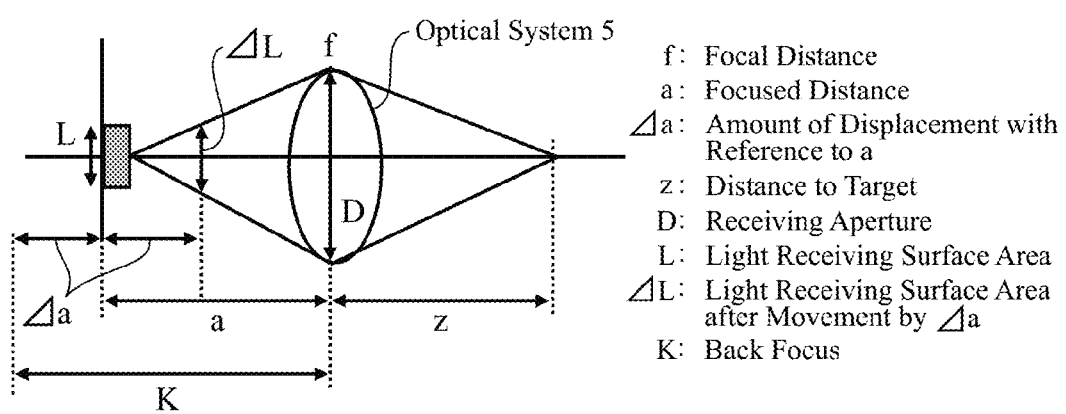
FIG. 14 is an explanatory drawing showing parameters of the model stored in the model storage unit 51.

FIG. 14 is an explanatory drawing showing each parameter of the model stored in the model storage unit 51.

$$\frac{1}{f} = \frac{1}{a} + \frac{1}{z} \tag{1}$$

$$\Delta L(K, z) = \Delta a \times \frac{D}{a} \tag{2}$$

$$\Delta a = K - a \tag{3}$$

$$\eta(K, z) \begin{cases} \text{if } L > \Delta L(K, z), & 1 \\ \text{else,} & \left(\frac{L}{\Delta L(K, z)}\right)^2 \end{cases} \tag{4}$$

$$f_\alpha(K, z) = \alpha \eta(K, z) \times \left(\frac{1}{z^2}\right) \tag{5}$$

The above-mentioned equation (1) shows the formula of the optical system, and the above-mentioned equation (2) shows the light receiving surface area at the time of defocus determined by the geometry.

Further, the equation (3) is a relational expression regarding defocus, and the equation (4) shows efficiency determined by back focus and the measurement distance.

Further, the equation (5) relates to a power envelope to which an attenuation due to the distance and the aerosol density are added.

The optimal position analysis unit 52 acquires a power envelope f(K, z)' at the time when the back focus is an arbitrary K, and derives α(=αmin) with the smallest least square error (LSM) by using the following equation (6).

$$\text{LSM}(\alpha) = \Sigma(f_\alpha(K,z) - f(K,z)')^2 \quad (6)$$

After deriving α, the optimal position analysis unit 52 calculates a minimum back focus value K satisfying the following conditional expression (7) (satisfying that the receive SNR is equal to or higher than a desired intensity value $T_{SNR}$, and a distance value $Z_k$ is equal to or greater than a desired distance value $Z_n$) by using the following equation (8) which is derived from the above-mentioned equations (1) to (5), where a desired maximum distance measurement value which is a value defined by the user is denoted by z=UR and the desired SNR is denoted by $U_{SNR}$.

$$f_{\alpha\,min}(K, U_R) \geq U_{SNR} \quad (7)$$

$$K \geq d\left(1 + \frac{L}{DU_R}\sqrt{\frac{\alpha}{U_{SNR}}}\right) \quad (8)$$

After calculating the minimum back focus value K by using the equation (8), the optimal position analysis unit 52 can acquire the desired distance at the desired SNR by controlling the position of the photodetector 6 (or the optical system 5) to the back focus value K.

This Embodiment 5 provides a merit of eliminating the necessary to perform a control operation of changing the position multiple times in the same way as that shown in any one of above-mentioned Embodiments 1 to 4, and being able to set an optimal installation position in a relatively short time.

Although the example in which the optimal position analysis unit 52 compares the envelope of a spectrum calculated by the spectrum and wind speed computing unit 23 and an envelope acquired from the model stored in the model storage unit 51, reconstructs a model under a current environment in which an aerosol 1 exists, and controls the position adjustment made by the optical unit adjustment driving unit 7 by using the model is shown in this Embodiment 5, the optimal position analysis unit can alternatively control a focus adjustment made by an optical condition adjuster by using a model reconstructed in the same way as above.

The optimal position analysis unit can calculate the minimum back focus value K by using the following equation (9) instead of the above-mentioned model.

$$\frac{1}{f} = \frac{1}{K} + \frac{1}{z} \quad (9)$$

$$SNR(R) \propto \frac{1}{\left\{1 + \left(1 - \frac{R}{z}\right)^2 \left[\frac{\pi(AcD)^2}{4\lambda R}\right]^2\right\}R^2} \quad (10)$$

An optimal installation position can be set by calculating the back focus value K which maximizes the SNR. Further, in a case in which the beam diameter is made variable, by making variable the beam diameter AcD and the back focus value K and then deriving these values, an optimal beam diameter and an optimal installation position can be set.

Embodiment 6

Although the case in which the laser light emitted from the optical system 5 of the light transmitting and receiving unit 2 and the laser light received by the optical system 5 are coaxial is shown in above-mentioned Embodiment 1 and so on, in a case in which they are non-coaxial, before optimizing an optical condition (the installation position or the focus), the optimal position analysis unit 24 (or the optimal position analysis unit 32, 42, or 52) can calculate the installation position of the photodetector 6 on the basis of the angle difference between the laser light emitted from the optical system 5 and the laser light received by the optical system 5, and the target distance R (the distance to an observation object to be measured), and the optical unit adjustment driving unit 7 can adjust the installation position of the photodetector 6 in such a way that the installation position of the photodetector 6 matches the calculation result acquired by the optimal position analysis unit 24 or the like.

Concretely, the processing is carried out as follows.

A radar device in accordance with this Embodiment 6 has a structure as shown in FIG. 2 showing the structure of the radar device in accordance with any one of above-mentioned Embodiments 1, 2, and 3, or a structure as shown in FIG. 8, 11, or 12.

Further, the radar device has a structure in which the photodetector 6 is adapted for a case in which a transmission beam and a received beam are not generated from an identical fiber (when they are non-coaxial), as shown in FIGS. 10(*b*) and 24.

Figure 20:
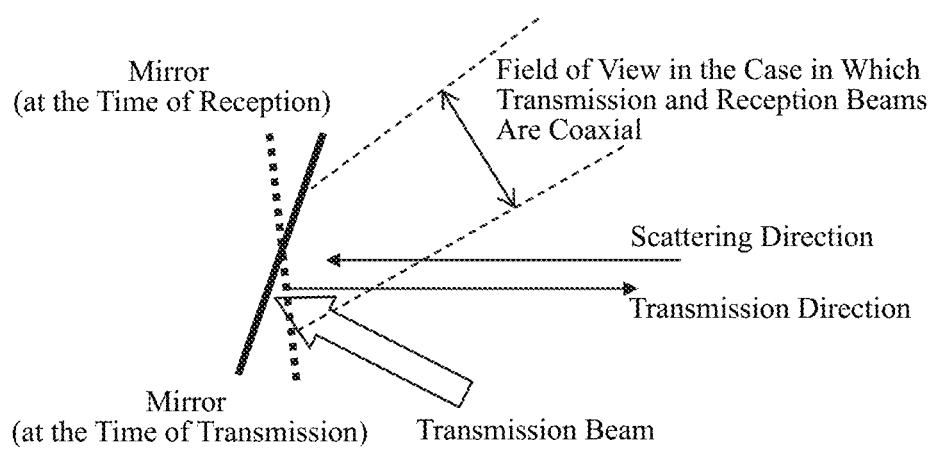
FIG. 20 is an explanatory drawing showing a displacement of an optic axis which occurs when a scan mirror has a high scanning angular speed in a case of a non-transmission/reception integrated radar device.

Although the example which can be adapted for a case in which the scan speeds of the transmission and received beams are low and the transmission beam and the received beam can be approximated to be nearly integrated is shown in above-mentioned Embodiments 1 and 2 and in a part of above-mentioned Embodiment 3, when the scan speeds of the transmission and received beams are high or a measurement of an object at a long distance is carried out in the structure, as shown in FIGS. 10(*b*) and 24, in which the transmission and received beams are non-coaxial, a displacement occurs between the receiving field of view in the case of having a coaxial structure for transmission/reception (the direction of the received beam), and the scattering direction (the beam incoming direction) because of a change between the angle of a mirror (the angle of a scanner) at the time of beam transmission and the angle of the mirror at the time of beam reception, as shown in FIG. 20.

Because the reception efficiency degrades as a result of this displacement, the displacement between the receiving field of view of light by a light transmitting and receiving unit 2 and the beam incoming direction is corrected by adjusting a fiber end 106 in this Embodiment 6.

Figure 21:
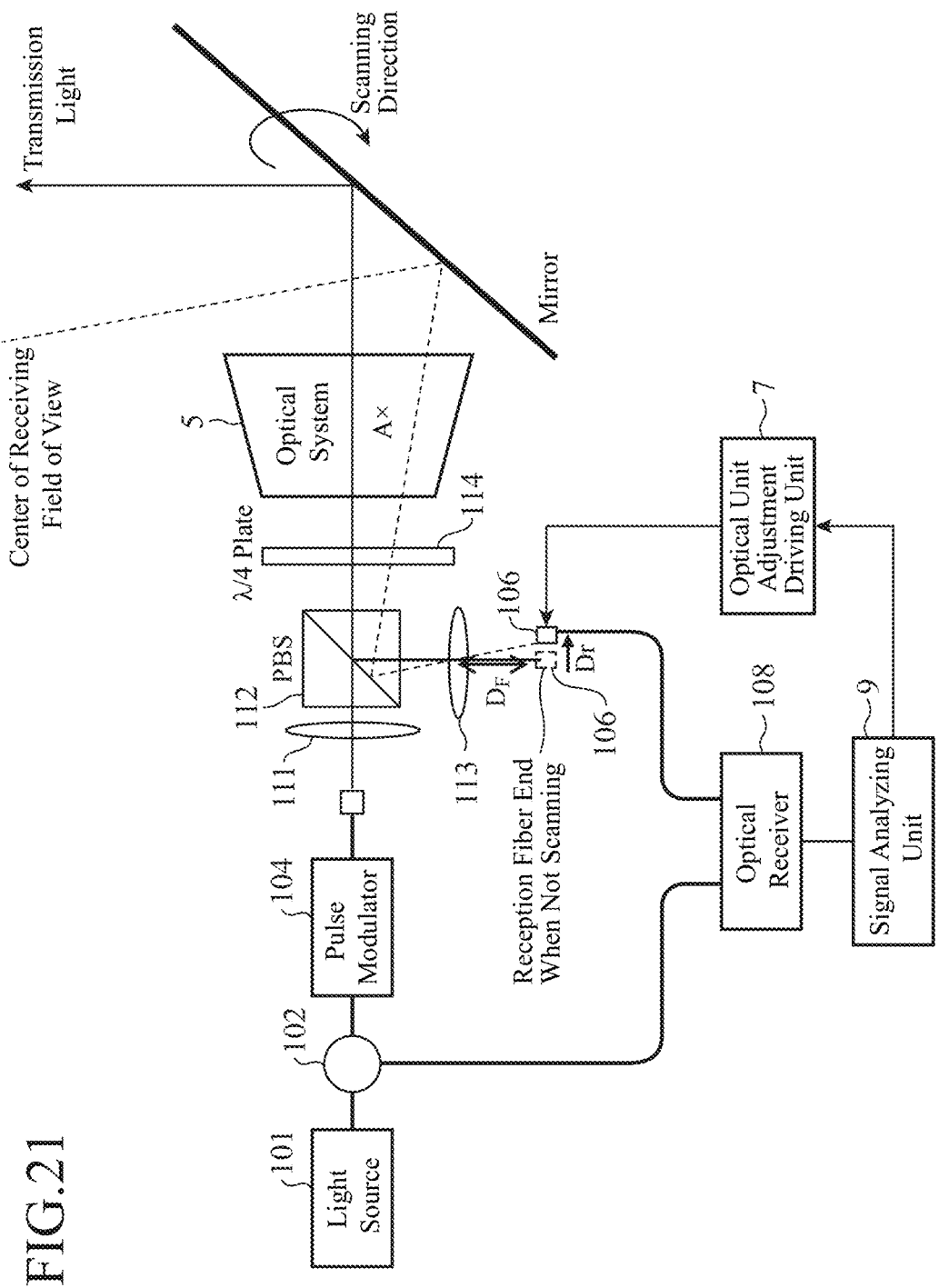
FIG. 21 is an explanatory drawing showing a method of correcting a displacement of the optic axis.

An optical unit adjustment driving unit 7 corrects the displacement between the receiving field of view and the scattering direction, which is caused by scanning, by moving the position of the fiber end 106 at the time of not scanning to shift the receiving field of view, as shown in FIG. 21.

For example, when the scanning angle of the mirror rotating between transmission and reception is denoted by θ, the magnification of an optical system 5 (e.g., abeam expander) is denoted by A, and the distance between an optical lens 113 and the fiber end 106 at the time of not scanning is denoted by $D_F$, the movement distance $D_r$ of the fiber end 106 is expressed by the following equation (11).

$$Dr = \frac{L}{D_F \tan^{-1}(A\theta)} \quad (11)$$

Further, when the scanning angular speed of the mirror is denoted by ω (rad/sec) and the target distance is denoted by R, the scanning angle θ of the mirror is expressed by the following equation (12).

$$\theta = \omega \frac{2R}{c} \quad (12)$$

In the equation (12), c denotes the speed of light.

For example, the target distance R cay be set by the user, and can be a maximum distance or the like which can be measured by a sensor.

The movement distance $D_r$ of the fiber end 106 is calculated by an optimal position analysis unit 24 or the like. The optimal position analysis unit 24 or the like outputs the movement distance $D_r$ from a current installation position to the optical unit adjustment driving unit 7 as the installation position of the photodetector 6.

When receiving the movement distance $D_r$ from the optimal position analysis unit 24 or the like, the optical unit adjustment driving unit 7 corrects the displacement between the receiving field of view and the scattering direction, which is caused by the scanning, by moving the position of the fiber end 106 by the movement distance $D_r$.

By correcting the displacement between the receiving field of view and the scattering direction this way, the efficiency of the received light can be improved. Therefore, there is provided an advantage of improving the SNR, and being able to carry out a measurement of an object at a further long distance as compared with above-mentioned Embodiment 1 and so on.

Although the case of one-dimensional scanning is explained in this Embodiment 6, in a case of two-dimensional scanning, what is necessary is just to calculate a movement distance $D_r$ in a rightward or leftward direction of the fiber end 106 and a movement distance $D_r'$ in a vertical direction of the fiber end 106, and perform a movement in the rightward or leftward direction and a movement in the vertical direction of the fiber end 106 according to the same concept.

Further, although the example of calculating the movement distance $D_r$ of the fiber end 106 by using the equation (11) is shown in this Embodiment 6, the present embodiment is not limited to this example.

For example, there can be a case in which a movement to a desired position cannot be performed when the adjustment accuracy of the optical unit adjustment driving unit 7 is low. To deal with such a case, a table showing an SNR-distance characteristic having the movement distance $D_r$ as a variable parameter can be acquired in advance (acquired during observation), the movement distance $D_r$ which makes it possible to carryout a measurement of an object at the farthest distance where the SNR exceeds an intensity threshold $T_{SNR}$ can be read from the table, and the movement distance $D_r$ can be used as a setting. As an alternative, a model which produces the same effect can be used.

Although the example in which the optical unit adjustment driving unit 7 moves the position of the fiber end 106 by the movement distance $D_r$ is shown in this Embodiment 6, the optical unit adjustment driving unit 7 can further incline the fiber end 106 toward the beam incoming direction on the basis of the magnification A of the optical system 5 and the scanning angle θ of the mirror.

More specifically, when the scanning angle θ of the mirror is large, the angle of incidence to the fiber end 106 becomes large, the area with which the fiber end 106 can receive the light becomes small, and hence the SNR degrades.

Therefore, in order to increase the area with which the fiber end 106 can receive the light to improve the SNR, the fiber end 106 is inclined on the basis of the magnification A of the optical system 5 and the scanning angle θ of the mirror.

The value of the movement distance $D_r$ increases with increase in the target distance R in the equation (12).

In contrast, there is a case in which the SNR at a short distance decreases with increase in the value of the target distance R.

Therefore, when the target distance R is longer than a predetermined threshold, a value R' which is acquired by decreasing the target distance R by the median (R/2) of the target distance R or an offset distance $R_{offs}$ determined by the user can be used as the target distance R.

$$R' = R - R_{offs} \quad (13)$$

As a result, a more stable measurement of an object in a range from a short distance to a long distance can be carried out.

Embodiment 7

In a radar device in accordance with this Embodiment 7, a signal analyzing unit 9 includes a number-of-integrations setting unit 41, as shown in FIG. 11.

Further, the radar device has a structure in which a photodetector 6 is adapted for a case in which a transmission beam and a received beam are not generated from an identical fiber (when they are non-coaxial), as shown in FIGS. 10(b) and 24.

Like in the case of above-mentioned Embodiment 6, when the beam is scanned at a high speed, the receive SNR regarding data about a distant range bin decreases.

Therefore, in accordance with this Embodiment 7, an optimal position analysis unit 42 controls the number of integrations set by the number-of-integrations setting unit 41 in such a way that the SNR for each range bin is equal to or higher than a threshold.

Setting the number of integrations in such away that the SNR for each range bin is equal to or higher than the threshold is equivalent to setting a different angular resolution for each range bin, and therefore a measurement at a high scanning speed can be carried out while the SNR at a long distance and the SNR at a short distance are ensured.

As an alternative, by recognizing a reduction of the signal to noise ratio and lowering the scanning speed of the beam, instead of increasing the number of integrations, a measurement at a high scanning speed can be carried out while the SNR at a long distance and the SNR at a short distance are ensured.

Embodiment 8

Figure 22:
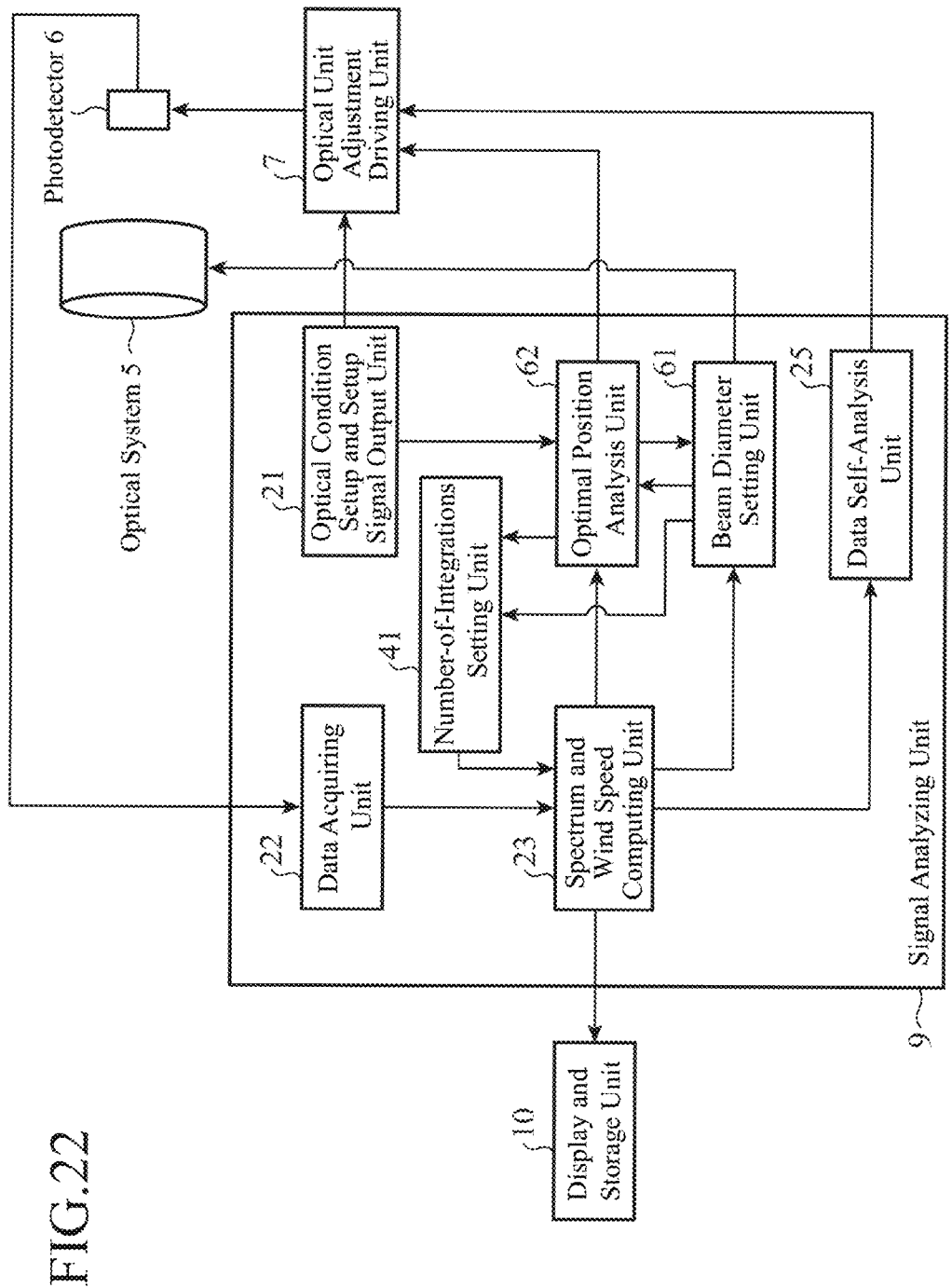
FIG. 22 is a structural diagram showing a signal analyzing unit 9 of a radar device in accordance with Embodiment 8 of the present invention.

FIG. 22 is a structural diagram showing a signal analyzing unit 9 of a radar device in accordance with Embodiment 8 of the present invention. In FIG. 22, because the same reference numerals as those shown in FIG. 11 denote the same components or like components, the explanation of the components will be omitted hereafter.

A beam diameter setting unit 61 performs a process of setting the beam diameter of laser light emitted from an optical system 5 of a light transmitting and receiving unit 2. The beam diameter setting unit 61 constructs a beam diameter setter.

An optimal position analysis unit 62 performs a process of controlling the number of integrations set by a number-of-integrations setting unit 41 in such a way that the SNR for each range bin at the beam diameter set by the beam diameter setting unit 61 is equal to or higher than a threshold, in addition to the same process as that performed by the optimal position analysis unit 42 of FIG. 11.

As an alternative, the optimal position analysis unit performs a process of controlling the beam diameter set by the beam diameter setting unit 61 in such a way that the SNR for each range bin at the number of integrations set by the number-of-integrations setting unit 41 is equal to or higher than the threshold.

The optimal position analysis unit 62 constructs an optical condition adjuster.

In the radar device in accordance with this Embodiment 8, the beam diameter is made to be variable in addition to a focused distance.

Figure 23:
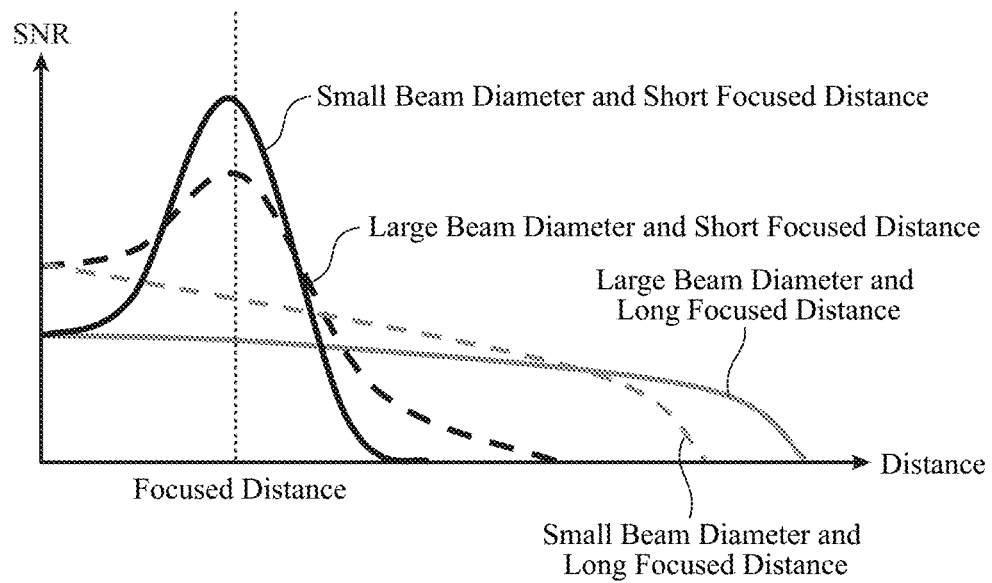
FIG. 23 is a schematic diagram showing an SNR-distance characteristic in a case of combining a beam diameter and a focused distance.

FIG. 23 is a schematic diagram showing an SNR-distance characteristic in a case of combining the beam diameter and the focused distance.

By setting the focused distance to be an infinite one, and increasing the beam diameter, an object at up to a long distance can be measured despite a low SNR. Further, by decreasing the beam diameter and also decreasing the focused distance, a wind measurement, with a high SNR, of an object at a distance equal to or shorter than the focused distance can be carried out.

Hereafter, the details of processing performed by the radar device in accordance with this Embodiment 8 will be explained concretely. In this embodiment, for convenience of explanation, although the radar device in which a new function is added to the structure in accordance with above-mentioned Embodiment 4 will be explained hereafter, the new function can be alternatively added to the structure in accordance with any one of above-mentioned Embodiments 1 to 7.

The beam diameter setting unit 61 is provided, in advance, with a table showing the SNR-distance characteristic (refer to FIG. 23) in the case of combining the beam diameter and the focused distance, reads a beam diameter corresponding to both a measurable distance and a desired SNR, which are set by the user, from the table, and controls the optical system. 5 in such a way that the beam diameter of the laser light emitted from the optical system 5 becomes equal to the read beam diameter.

Although the example of reading a beam diameter from the table is shown in this embodiment, the beam diameter AcD of the laser light emitted from the optical system. 5 can be calculated by using the following model.

$$SNR(R) = \frac{\eta_D(R)\lambda E\beta K_{atm}^{2R/1000}\pi D^2}{8h\nu BR^2} \quad (13)$$

$$\eta_D(R) = \frac{\eta^F}{\left\{1+\left(1-\frac{R}{z}\right)^2\left[\frac{\pi(AcD)^2}{4\lambda R}\right]^2+\left(\frac{AcD}{2S_0(R)}\right)^2\right\}} \quad (14)$$

In the equations (13) and (14), h denotes the Planck's constant (Js), $\nu$ denotes the frequency of the light (Hz), $\lambda$ denotes the wavelength of the light (m), and B denotes a receiving bandwidth (Hz), and, when a Wideband SNR is calculated, is an entire analog receiving bandwidth.

Further, R denotes a target distance (m), z denotes the focused distance (m), D denotes the effective aperture (m) of the optical system, E denotes the energy of a transmission pulse (J), $\beta$ denotes the atmospheric backscatter coefficient (/m/sr), and $K_{atm}$ denotes the atmospheric transmittance (/km).

In the equation (14), the inside of the brackets in the denominator is a term that determines the distance dependence of the reception coupling efficiency, a second term in the brackets relates to the curvature of the optical system (a focal distance setting), and a third term in the brackets relates to a fluctuation in the atmospheric air.

Further, $S_0$ denotes the transverse coherence length. $\eta^F$ denotes a coefficient for taking into consideration the influence of truncation of the transmission beam, and AcD denotes the diameter of the beam.

As can be seen from this equation, when the distance R of a certain target is measured, the received SNR is maximized by making the focused distance equal to the target distance R.

After the beam diameter setting unit 61 sets the beam diameter AcD, the optimal position analysis unit 62 controls the number of integrations set by the number-of-integrations setting unit 41 in such a way that the SNR for each range bin at the beam diameter AcD is equal to or higher than the threshold.

Although the example in which after the beam diameter setting unit 61 sets the beam diameter AcD, the optimal position analysis unit 62 controls the number of integrations set by the number-of-integrations setting unit 41 is shown in this embodiment, the optimal position analysis unit 62 can alternatively control the beam diameter set by the beam diameter setting unit 61 in such a way that the SNR for each range bin at the number of integrations is equal to or higher than the threshold after the number-of-integrations setting unit 41 sets the number of integrations.

The adjustment of the focused distance and the method of adjusting the beam diameter which are shown in any one of above-mentioned Embodiments 1 to 8 can be applied to a PPI (Plane Position Indicator) measurement of performing one-dimensional scanning to acquire a wind speed cross section in an LOS (Line Of Sight) direction, a VAD (Velocity AZIMUTH Display) method of calculating a wind speed value and a wind direction value in scanning space by performing scanning in a direction of an azimuthal angle, and so on, as well as to a point observation of observing a wind speed at one point.

A change of the optimal position, the beam diameter, the number of integrations, and the scan speed is carried out in real time. As an alternative, in a case of PPI scanning or VAD scanning, by using a method of measuring the dependence of the signal to noise ratio on distance in each direction once at a certain scanning speed, and making the signal analyzing unit 9 determine the scanning speed in each direction, an optimal position for the fiber end 106, the optimal position corresponding to the photodetector 6, the beam diameter, and the number of integrations on the basis of the result of the measurement, an optimal measurement can be implemented according to the direction in which the measurement is carried out.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The radar device in accordance with the present invention is suitable for use as a radar device that needs to measure the speed of fine liquid droplets or solid particles, or the like floating in, for example, atmospheric air in a short time with a high degree of accuracy.

EXPLANATIONS OF REFERENCE NUMERALS

1 aerosol (observation object), 2 light transmitting and receiving unit, 3 optical oscillation unit (optical oscillator), 4 optical unit (light transmitter and receiver), 5 optical system, 6 photodetector, 7 optical unit adjustment driving unit (optical condition adjuster), 8 signal processing unit, 9 signal analyzing unit, 10 display and storage unit (observation result outputter), 21 optical condition setup and setup signal output unit (optical condition adjuster), 22 data acquiring unit (spectrum and speed calculator), 23 spectrum and wind speed computing unit (spectrum and speed calculator), 24 optimal position analysis unit (optical condition optimizer), 25 data self-analysis unit, 31 temporary storage unit (storage), 32 optimal position analysis unit (optical condition optimizer), 41 number-of-integrations setting unit (number-of-integrations setter), 42 optimal position analysis unit (optical condition optimizer), 51 model storage unit (model storage), 52 optimal position analysis unit (optical condition optimizer), 61 beam diameter setting unit (beam diameter setter), 62 optimal position analysis unit (optical condition adjuster), 101 light source, 102 optical splitter, 103 amplifier, 104 pulse modulator, 105 optical circulator, 106 fiber end, 107 optical coupler, 108 optical receiver, 111 transmission beam adjustment optical system, 112 PBS, 113 optical lens, 114 $\lambda/4$ plate.

The invention claimed is:

1. A radar device comprising:
an optical oscillator that oscillates light;
an optical system that emits the light oscillated by said optical oscillator into atmospheric air and also receives said light which is reflected by an observation object existing in the atmospheric air and returns thereto;
a photodetector that detects the light received by said optical system and outputs data showing a signal intensity of the detected light;
a spectrum and speed calculator that calculates a spectrum by analyzing the data outputted from said photodetector, and also calculates both a speed of said observation object and a signal to noise ratio for each distance to said observation object from said spectrum;
an optical condition adjuster that adjusts an optical condition of either said photodetector or said optical system; and
an optical condition optimizer that determines said optical condition from a distance where said signal to noise ratio calculated by said spectrum and speed calculator crosses a threshold again after exceeding said threshold.

2. The radar device according to claim 1, wherein
said optical condition adjuster adjusts, as the optical condition of said photodetector, a position where said photodetector is installed, and
said optical condition optimizer determines the installation position of said photodetector from the distance where said signal to noise ratio calculated by said spectrum and speed calculator crosses the threshold again after exceeding said threshold.

3. The radar device according to claim 2, wherein
a storage that stores a spectrum calculated by said spectrum and speed calculator and also stores the installation position of said photodetector at a time when said spectrum is calculated is disposed, and
said optical condition optimizer searches through one or more installation positions of said photodetector which are stored in said storage for the installation position of said photodetector by using one or more spectra stored in said storage.

4. The radar device according to claim 2, wherein
the radar device includes a number-of-integrations setter that, when said spectrum and speed calculator uses a method of splitting time-series data outputted from said photodetector into range bins, and performing integration processing within each of the range bins to calculate the speed of said observation object, sets up a number of integrations in the integration processing within said each of the range bins, and
wherein said optical condition optimizer searches for the installation position of said photodetector while controlling the number of integrations set by said number-of-integrations setter.

5. The radar device according to claim 2, wherein
a model storage that stores a model of an envelope function in a spectrum is disposed, and
wherein said optical condition optimizer compares an envelope of a spectrum calculated by said spectrum and speed calculator and an envelope acquired from the model stored in said model storage, reconstructs a model under a current environment in which said observation object exists, and controls the position adjustment made by said optical condition adjuster by using said model.

6. The radar device according to claim 1, wherein
said optical condition adjuster adjusts, as the optical condition of said optical system, a focus of said optical system, and
said optical condition optimizer determines the focus of said optical system from the distance where said signal to noise ratio calculated by said spectrum and speed calculator crosses the threshold again after exceeding said threshold.

7. The radar device according to claim 6, wherein
a storage that stores a spectrum calculated by said spectrum and speed calculator and also stores the focus of said optical system at a time when said spectrum is calculated is disposed, and
said optical condition optimizer searches through one or more focuses of said optical system which are stored in said storage for the focus of said optical system by using one or more spectra stored in said storage.

8. The radar device according to claim 6, wherein
the radar device includes a number-of-integrations setter that, when said spectrum and speed calculator uses a method of splitting time-series data outputted from said photodetector into range bins, and performing integration processing within each of the range bins to calculate the speed of said observation object, sets up a number of integrations in the integration processing within said each of the range bins, and
wherein said optical condition optimizer searches for the focus of said optical system while controlling the number of integrations set by said number-of-integrations setter.

9. The radar device according to claim 6, wherein
a model storage that stores a model of an envelope function in a spectrum is disposed, and
wherein said optical condition optimizer compares an envelope of a spectrum calculated by said spectrum and speed calculator and an envelope acquired from the model stored in said model storage, reconstructs a model under a current environment in which said observation object exists, and controls the focus adjustment made by said optical condition adjuster by using said model.

10. The radar device according to claim 1, wherein an observation result outputter that stores the speed of said observation object calculated by said spectrum and speed calculator and also displays the speed of said observation object is disposed.

11. The radar device according to claim 1, wherein the radar device includes a number-of-integrations setter that, when said spectrum and speed calculator uses a method of splitting time-series data outputted from said photodetector into range bins, and performing integration processing within each of the range bins to calculate the speed of said observation object, sets up a number of integration times in the integration processing within said each of the range bins.

12. The radar device according to claim 1, wherein
when the light emitted from the optical system the light received by said optical system are non-coaxial, said optical condition optimizer calculates the installation position of said photodetector on a basis of both an angle difference between the light emitted from said optical system and the light received by said optical system, and a distance to said observation object to be measured before determining the optical condition, and
said optical condition adjuster adjusts the installation position of said photodetector in such a way that the installation position of said photodetector matches a result of the calculation by said optical condition optimizer.

13. The radar device according to claim 12, wherein said optical condition adjuster corrects a displacement between a receiving field of view of light by said photodetector and an incoming direction of light by adjusting a position of a fiber end in said photodetector which receives the light.

14. The radar device according to claim 1, wherein
the radar device includes a number-of-integrations setter that, when said spectrum and speed calculator uses a method of splitting time-series data outputted from said photodetector into range bins, and performing integration processing within each of the range bins to calculate the speed of said observation object, sets up a number of integrations in the integration processing within each of the range bins, and
wherein said optical condition optimizer controls the number of integrations set by said number-of-integrations setter in such a way that a signal to noise ratio of each of the range bins is equal to or higher than a threshold.

15. The radar device according to claim 1, wherein
the radar device includes a number-of-integrations setter that, when said spectrum and speed calculator uses a method of splitting time-series data outputted from said photodetector into range bins, and performing integration processing within each of the range bins to calculate the speed of said observation object, sets up a number of integrations in the integration processing within each of the range bins, and a beam diameter setter that sets up a beam diameter of the light emitted from the optical system, and
wherein said optical condition optimizer controls the number of integrations set by said number-of-integrations setter in such a way that a signal to noise ratio of each of the range bins at the beam diameter set by said beam diameter setter is equal to or higher than a threshold.

16. The radar device according to claim 1, wherein
the radar device includes a number-of-integrations setter that, when said spectrum and speed calculator uses a method of splitting time-series data outputted from said photodetector into range bins, and performing integration processing within each of the range bins to calculate the speed of said observation object, sets up a number of integrations in the integration processing within each of the range bins, and a beam diameter setter that sets up a beam diameter of the light emitted from the optical system, and
wherein said optical condition optimizer controls the beam diameter set by said beam diameter setter in such a way that a signal to noise ratio of each of the range bins at the number of integrations set by said number-of-integrations setter is equal to or higher than a threshold.

17. The radar device according to claim 1, further comprising:
a beam diameter setter that sets up a beam diameter of the light emitted from the optical system of said light transmitter and receiver.

* * * * *